US00RE50112E

(19) United States
(12) Reissued Patent
Bauman et al.

(10) Patent Number: US RE50,112 E
(45) Date of Reissued Patent: *Sep. 3, 2024

(54) DISTRIBUTED DIGITAL ANTENNA SYSTEM

(71) Applicant: Outdoor Wireless Networks LLC, Claremont, NC (US)

(72) Inventors: Donald R. Bauman, Waseca, MN (US); Philip M. Wala, Savage, MN (US); Jeffrey O. Brennan, Waseca, MN (US)

(73) Assignee: Outdoor Wireless Networks LLC, Claremont, NC (US)

( * ) Notice: This patent is subject to a terminal disclaimer.

(21) Appl. No.: 18/095,889

(22) Filed: Jan. 11, 2023

Related U.S. Patent Documents

Reissue of:
(64) Patent No.: 8,958,789
Issued: Feb. 17, 2015
Appl. No.: 10/395,743
Filed: Mar. 24, 2003

U.S. Applications:
(63) Continuation of application No. 15/436,605, filed on Feb. 17, 2017, now Pat. No. Re. 49,377, which is an application for the reissue of Pat. No. 8,958,789.
(Continued)

(51) Int. Cl.
*H04W 4/00* (2018.01)
*G06F 1/03* (2006.01)
(Continued)

(52) U.S. Cl.
CPC . *H04B 10/25759* (2013.01); *H04B 10/25755* (2013.01); *H04B 1/40* (2013.01); *H04W 16/26* (2013.01)

(58) Field of Classification Search
CPC ..... H04B 10/2575; H04B 10/25751; H04B 10/25752; H04B 10/25759; H04B 7/2606;
(Continued)

(56) References Cited

U.S. PATENT DOCUMENTS 3,783,385 A 1/1974 Dunn et al.
3,931,473 A 1/1976 Ferris, Jr.
(Continued)

FOREIGN PATENT DOCUMENTS

CA 2008900 10/1990
CA 2008900 C 1/1998
(Continued)

OTHER PUBLICATIONS

USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01393, Sep. 2, 2021, pp. Cover through 3, Re: U.S. Pat. No. 8,577,286, from U.S. Appl. No. 13/662,948.
(Continued)

*Primary Examiner* — Minh Dieu Nguyen
(74) *Attorney, Agent, or Firm* — Fogg & Powers LLC

(57) ABSTRACT

An optical medium, such as fiber, is tapped to provide an antenna port wherever radio service coverage is desired. Each antenna port is a bi-directional remote unit that receives a digital optical signal from a host unit and transforms the signal to a radio frequency signal for transmission by the remote unit. The remote unit receives radio frequency signals that are converted to digital signals and summed with signals from other remote units and converted to an optical signal for transmission to the host unit.

18 Claims, 4 Drawing Sheets

Related U.S. Application Data

(60) Provisional application No. 60/430,434, filed on Dec. 3, 2002.

(51) Int. Cl.

| | |
|---|---|
| ***H04B 10/00*** | (2013.01) |
| ***H04B 10/2575*** | (2013.01) |
| *H04B 1/40* | (2015.01) |
| *H04W 16/26* | (2009.01) |

(58) Field of Classification Search

CPC ..... H04B 7/17; H04B 7/165; H04B 7/15592; H04B 7/15585; H04B 7/15578; H04B 7/15571; H04B 7/15564; H04B 7/15557; H04B 7/1555; H04L 12/2885; H04W 88/04; H04W 16/26

See application file for complete search history.

(56) References Cited

U.S. PATENT DOCUMENTS 4,101,834 A 7/1978 Stutt et al.
4,112,488 A 9/1978 Smith, III
4,144,409 A 3/1979 Utano et al.
4,144,411 A 3/1979 Frenkiel
4,183,054 A 1/1980 Patisaul et al.
4,231,116 A 10/1980 Sekiguchi et al.
4,244,046 A 1/1981 Brouard et al.
4,354,167 A 10/1982 Terreault et al.
4,402,076 A 8/1983 Krajewski
4,451,699 A 5/1984 Gruenberg
4,451,916 A 5/1984 Casper et al.
4,456,793 A 6/1984 Baker et al.
4,475,010 A 10/1984 Huensch et al.
4,485,486 A 11/1984 Webb et al.
4,525,861 A 6/1985 Freeburg
4,531,239 A 7/1985 Usui
4,556,760 A 12/1985 Goldman
4,596,051 A 6/1986 Feldman
4,611,323 A 9/1986 Hessenmuller
4,613,990 A 9/1986 Halpern
4,628,501 A 12/1986 Loscoe
4,654,843 A 3/1987 Roza et al.
4,667,319 A 5/1987 Chum
4,669,107 A 5/1987 Eriksson-Lennartsson
4,691,292 A 9/1987 Rothweiler
4,701,909 A 10/1987 Kavehrad et al.
4,704,733 A 11/1987 Kawano
4,718,004 A 1/1988 Dalal
4,726,644 A 2/1988 Mathis
4,754,451 A 6/1988 Eng et al.
4,755,795 A 7/1988 Page
4,759,000 A 7/1988 Reitz
4,759,051 A 7/1988 Han
4,759,057 A 7/1988 De Luca et al.
4,760,573 A 7/1988 Calvignac et al.
4,779,064 A 10/1988 Monser
4,790,000 A 12/1988 Kinoshita
4,797,947 A 1/1989 Labedz
4,812,846 A 3/1989 Noro
4,816,825 A 3/1989 Chan et al.
4,831,662 A 5/1989 Kuhn
4,849,963 A 7/1989 Kawano et al.
4,868,862 A 9/1989 Ryoichi et al.
4,881,082 A 11/1989 Graziano
4,916,460 A 4/1990 Powell
4,920,533 A 4/1990 Dufresne et al.
4,932,049 A 6/1990 Lee
4,959,829 A 9/1990 Griesing
4,977,593 A 12/1990 Ballance
4,999,831 A 3/1991 Grace
5,067,147 A 11/1991 Lee
5,067,173 A 11/1991 Gordon et al.
5,084,869 A 1/1992 Russell
5,134,709 A 7/1992 Bi et al.
5,136,410 A 8/1992 Heiling et al.
5,138,440 A 8/1992 Radice
5,159,479 A 10/1992 Takagi
5,164,914 A 11/1992 Anderson
5,175,867 A 12/1992 Wejke et al.
5,193,109 A 3/1993 Chien-Yeh Lee
5,243,598 A 9/1993 Lee
5,251,053 A 10/1993 Heidemann
5,265,039 A 11/1993 Curbelo et al.
5,267,261 A 11/1993 Blakeney, II et al.
5,272,700 A 12/1993 Hansen et al.
5,278,690 A 1/1994 Vella-Coleiro
5,280,472 A 1/1994 Gilhousen et al.
5,285,469 A 2/1994 Vanderpool
5,297,193 A 3/1994 Bouix et al.
5,299,198 A 3/1994 Kay et al.
5,301,056 A 4/1994 O'Neill
5,303,287 A 4/1994 Laborde
5,305,308 A 4/1994 English et al.
5,309,474 A 5/1994 Gilhousen et al.
5,313,461 A 5/1994 Ahl et al.
5,321,736 A 6/1994 Beasley
5,321,849 A 6/1994 Lemson
5,339,184 A 8/1994 Tang
5,379,455 A 1/1995 Koschek
5,381,459 A 1/1995 Lappington
5,392,453 A 2/1995 Gudmundson et al.
5,400,391 A 3/1995 Emura et al.
5,442,681 A 8/1995 Kotzin et al.
5,442,700 A 8/1995 Snell et al.
5,457,557 A * 10/1995 Zarem et al. ..... 398/116
5,461,627 A 10/1995 Rypinski
5,499,047 A 3/1996 Terry et al.
5,513,176 A 4/1996 Dean et al.
5,519,691 A 5/1996 Darcie et al.
5,528,582 A 6/1996 Bodeep et al.
5,533,011 A 7/1996 Dean et al.
5,545,397 A 8/1996 Spielvogel et al.
5,552,920 A * 9/1996 Glynn ..... 398/126
5,566,168 A 10/1996 Dent
5,579,341 A 11/1996 Smith et al.
5,586,121 A 12/1996 Moura et al.
5,587,734 A 12/1996 Lauder et al.
5,592,470 A 1/1997 Rudrapatna et al.
5,603,080 A 2/1997 Källander et al.
5,606,736 A 2/1997 Hasler et al.
5,619,202 A 4/1997 Wilson et al.
5,621,730 A 4/1997 Kelley
5,621,786 A 4/1997 Fischer et al.
5,627,879 A 5/1997 Russell et al.
5,630,204 A 5/1997 Hylton et al.
5,631,757 A 5/1997 Bodeep et al.
5,642,405 A 6/1997 Fischer et al.
5,644,622 A 7/1997 Russell et al.
5,657,374 A 8/1997 Russell et al.
5,682,256 A 10/1997 Motley et al.
5,708,961 A 1/1998 Hylton et al.
5,715,235 A 2/1998 Sawahashi et al.
5,724,385 A * 3/1998 Levin et al. ..... 375/146
5,732,076 A 3/1998 Ketseoglou et al.
5,748,683 A 5/1998 Smith et al.
5,752,170 A 5/1998 Clifford
5,761,619 A 6/1998 Danne et al.
5,765,097 A 6/1998 Dail
5,765,099 A 6/1998 Georges et al.
5,771,449 A 6/1998 Blasing et al.
5,774,085 A 6/1998 Yanagimoto et al.
5,774,660 A 6/1998 Brendel et al.
5,774,789 A 6/1998 Van der Kaay et al.
5,781,541 A 7/1998 Schneider
5,781,859 A 7/1998 Beasley
5,781,865 A 7/1998 Gammon
5,802,173 A 9/1998 Hamilton-Piercy et al.
5,805,983 A 9/1998 Naidu et al.
5,809,395 A 9/1998 Hamilton-Piercy et al.
5,809,422 A 9/1998 Raleigh et al.
5,809,431 A 9/1998 Bustamante et al.
5,812,605 A 9/1998 Smith et al.
5,818,883 A 10/1998 Smith et al.

(56) References Cited

U.S. PATENT DOCUMENTS 5,822,324 A 10/1998 Kostresti et al.
5,852,651 A 12/1998 Fischer et al.
5,874,914 A 2/1999 Krasner
5,878,325 A 3/1999 Dail
5,880,863 A 3/1999 Rideout et al.
5,883,882 A 3/1999 Schwartz
5,907,544 A 5/1999 Rypinski
5,930,682 A 7/1999 Schwartz et al.
5,946,622 A 8/1999 Bojeryd
5,969,837 A 10/1999 Farber et al.
5,978,650 A 11/1999 Fischer et al.
5,987,014 A 11/1999 Magill et al.
6,005,506 A 12/1999 Bazarjani et al.
6,005,884 A 12/1999 Cook et al.
6,009,130 A * 12/1999 Lurey et al. ..... 375/347
6,014,366 A 1/2000 Ichiyoshi
6,034,950 A 3/2000 Sauer et al.
6,061,089 A * 5/2000 Tonkin et al. ..... 348/211.6
6,108,113 A 8/2000 Fee
6,108,550 A 8/2000 Wiorek et al.
6,108,626 A 8/2000 Cellario et al.
6,112,086 A 8/2000 Wala
6,122,529 A 9/2000 Sabat, Jr. et al.
6,128,470 A 10/2000 Naidu et al.
6,128,471 A 10/2000 Quelch et al.
6,147,786 A 11/2000 Pan
6,150,993 A 11/2000 Dobrovolny
6,157,659 A 12/2000 Bird
6,181,687 B1 1/2001 Bisdikian
6,188,693 B1 2/2001 Murakami
6,192,216 B1 2/2001 Sabat, Jr. et al.
6,198,558 B1 3/2001 Graves et al.
6,222,660 B1 4/2001 Traa
6,223,021 B1 4/2001 Silvia et al.
6,226,274 B1 5/2001 Reese et al.
6,253,094 B1 6/2001 Schmutz
6,259,910 B1 7/2001 Fairfield et al.
6,262,981 B1 7/2001 Schmutz
6,263,135 B1 * 7/2001 Wade ..... 385/37
6,275,990 B1 8/2001 Dapper et al.
6,298,246 B1 10/2001 Lysejko et al.
6,307,877 B1 10/2001 Philips et al.
6,308,085 B1 10/2001 Shoki
6,317,884 B1 11/2001 Eames et al.
6,336,042 B1 1/2002 Dawson et al.
6,337,754 B1 * 1/2002 Imajo ..... 398/115
6,349,200 B1 2/2002 Sabat, Jr. et al.
6,353,600 B1 3/2002 Schwartz et al.
6,356,369 B1 3/2002 Farhan
6,356,374 B1 3/2002 Farhan
6,362,908 B1 3/2002 Kimbrough et al.
6,373,611 B1 4/2002 Farhan et al.
6,373,887 B1 4/2002 Aiyagari et al.
6,374,124 B1 4/2002 Slabinski
6,377,640 B2 4/2002 Trans
6,442,405 B1 8/2002 Hiramatsu et al.
6,449,071 B1 9/2002 Farhan et al.
6,463,301 B1 * 10/2002 Bevan et al. ..... 455/562.1
6,466,572 B1 10/2002 Ethridge et al.
6,480,551 B1 11/2002 Ohishi et al.
6,480,702 B1 11/2002 Sabat, Jr.
6,486,907 B1 * 11/2002 Farber et al. ..... 725/78
6,496,546 B1 12/2002 Allpress et al.
6,498,936 B1 12/2002 Raith
6,504,831 B1 1/2003 Greenwood et al.
6,535,720 B1 3/2003 Kintis et al.
6,567,473 B1 5/2003 Tzannes
6,580,905 B1 6/2003 Naidu et al.
6,594,496 B2 7/2003 Schwartz
6,622,013 B1 9/2003 Miyoshi et al.
6,643,498 B1 11/2003 Miyajima
6,667,973 B1 12/2003 Gorshe et al.
6,674,966 B1 1/2004 Koonen
6,697,603 B1 2/2004 Lovinggood et al.
6,704,545 B1 3/2004 Wala
6,729,929 B1 5/2004 Sayers et al.
6,731,904 B1 5/2004 Judd
6,738,581 B2 * 5/2004 Handelman ..... 398/79
6,745,003 B1 6/2004 Maca et al.
6,751,417 B1 6/2004 Combs et al.
6,768,745 B1 7/2004 Gorshe et al.
6,771,933 B1 8/2004 Eng et al.
6,785,558 B1 8/2004 Stratford et al.
6,799,020 B1 9/2004 Heidmann et al.
6,801,767 B1 10/2004 Schwartz et al.
6,807,374 B1 10/2004 Imajo et al.
6,826,163 B2 11/2004 Mani et al.
6,826,164 B2 11/2004 Mani et al.
6,831,901 B2 12/2004 Millar
6,865,390 B2 3/2005 Goss et al.
6,907,048 B1 6/2005 Treadaway et al.
6,917,614 B1 7/2005 Laubach et al.
6,963,552 B2 11/2005 Sabat, Jr. et al.
6,967,966 B1 11/2005 Donohue
6,980,831 B2 * 12/2005 Matsuyoshi et al. ..... 455/561
7,016,308 B1 3/2006 Gallagher
7,031,335 B1 4/2006 Donohue et al.
7,035,671 B2 4/2006 Solum
7,047,313 B1 5/2006 Broerman
7,075,369 B2 7/2006 Takenaka
7,103,279 B1 9/2006 Koh et al.
7,103,377 B2 9/2006 Bauman et al.
7,127,175 B2 * 10/2006 Mani et al. ..... 398/115
7,171,244 B2 1/2007 Bauman
7,184,728 B2 2/2007 Solum
7,190,903 B1 3/2007 Combs et al.
7,205,864 B2 4/2007 Schultz, Jr. et al.
7,215,651 B2 5/2007 Millar
7,257,328 B2 8/2007 Levinson et al.
7,289,972 B2 10/2007 Rieser et al.
7,313,415 B2 12/2007 Wake et al.
7,359,447 B2 4/2008 Sage
RE40,564 E 11/2008 Fischer et al.
7,505,747 B2 3/2009 Solum
7,512,419 B2 3/2009 Solum
7,539,509 B2 5/2009 Bauman et al.
7,548,695 B2 6/2009 Wake
7,610,046 B2 10/2009 Wala
7,614,074 B2 11/2009 Mobley et al.
7,639,982 B2 12/2009 Wala
7,702,985 B2 4/2010 Millar
7,761,093 B2 7/2010 Sabat, Jr. et al.
5,627,879 C1 9/2010 Russell et al.
5,657,374 C1 9/2010 Russell et al.
7,848,747 B2 12/2010 Wala
7,848,770 B2 12/2010 Scheinert
7,917,177 B2 3/2011 Bauman
7,920,858 B2 4/2011 Sabat, Jr. et al.
7,962,111 B2 6/2011 Solum
8,019,221 B2 9/2011 Zancewicz
8,032,916 B2 10/2011 Oyadomari et al.
8,160,570 B2 4/2012 Sabat, Jr. et al.
8,290,483 B2 10/2012 Sabat, Jr. et al.
8,326,218 B2 12/2012 Wala
8,346,091 B2 1/2013 Kummetz et al.
RE43,964 E 2/2013 Fischer et al.
8,446,530 B2 5/2013 Bellers
8,559,939 B2 10/2013 Sabat, Jr. et al.
8,577,286 B2 11/2013 Wala
RE45,321 E 1/2015 Fischer et al.
8,958,410 B2 2/2015 Fischer et al.
8,958,789 B2 2/2015 Bauman et al.
9,332,402 B2 5/2016 Wala
9,467,876 B2 10/2016 Kummetz et al.
9,867,052 B2 1/2018 Sabat, Jr. et al.
10,075,243 B2 9/2018 Fischer et al.
10,321,328 B2 6/2019 Sabat, Jr. et al.
10,498,434 B2 12/2019 Wala
10,505,635 B2 12/2019 Wala
RE49,377 E 1/2023 Bauman et al.
2001/0031014 A1 10/2001 Subramanian et al.
2001/0036163 A1 11/2001 Sabat, Jr. et al.
2002/0003645 A1 * 1/2002 Kim et al. ..... 359/145
2002/0072329 A1 6/2002 Bandeira et al.

(56) References Cited

U.S. PATENT DOCUMENTS

| | | | |
|---|---|---|---|
| 2002/0167954 | A1 | 11/2002 | Highsmith et al. |
| 2002/0191565 | A1 | 12/2002 | Mani et al. |
| 2003/0015943 | A1 | 1/2003 | Kim et al. |
| 2003/0043928 | A1 | 3/2003 | Ling et al. |
| 2003/0060178 | A1 | 3/2003 | Ghassemzadeh et al. |
| 2003/0066087 | A1 | 4/2003 | Sawyer et al. |
| 2003/0133182 | A1 | 7/2003 | Ng et al. |
| 2003/0143947 | A1* | 7/2003 | Lyu ..... 455/7 |
| 2003/0157943 | A1 | 8/2003 | Sabat, Jr. |
| 2003/0162516 | A1 | 8/2003 | Solum |
| 2004/0010609 | A1 | 1/2004 | Vilander et al. |
| 2004/0037565 | A1 | 2/2004 | Young et al. |
| 2004/0198453 | A1 | 10/2004 | Cutrer et al. |
| 2004/0203339 | A1 | 10/2004 | Bauman |
| 2004/0219950 | A1 | 11/2004 | Pallonen et al. |
| 2005/0007993 | A1 | 1/2005 | Chambers et al. |
| 2005/0131645 | A1 | 6/2005 | Panopoulos |
| 2005/0147067 | A1 | 7/2005 | Mani et al. |
| 2005/0201323 | A1 | 9/2005 | Mani et al. |
| 2005/0243785 | A1 | 11/2005 | Sabat, Jr. et al. |
| 2005/0250503 | A1 | 11/2005 | Cutrer |
| 2006/0121944 | A1 | 6/2006 | Buscaglia et al. |
| 2006/0193295 | A1 | 8/2006 | White et al. |
| 2007/0166036 | A1 | 7/2007 | Combs et al. |
| 2009/0034979 | A1 | 2/2009 | Zancewicz |
| 2009/0067841 | A1 | 3/2009 | Combs et al. |
| 2010/0061291 | A1 | 3/2010 | Wala |
| 2011/0182583 | A1 | 7/2011 | Rakib |
| 2011/0265140 | A1 | 10/2011 | Rakib |
| 2013/0122952 | A1 | 5/2013 | Wala |
| 2014/0016583 | A1 | 1/2014 | Smith |
| 2014/0036758 | A1 | 2/2014 | Wala |
| 2016/0056874 | A1 | 2/2016 | Wala |
| 2017/0026857 | A1 | 1/2017 | Kummetz et al. |
| 2018/0278299 | A1 | 9/2018 | Morrison |

FOREIGN PATENT DOCUMENTS

| | | | |
|---|---|---|---|
| CN | 1127056 | | 7/1996 |
| CN | 1127056 | A | 7/1996 |
| CN | 1362799 | A | 8/2002 |
| DE | 3707244 | | 9/1988 |
| DE | 3707244 | C2 | 1/1990 |
| EP | 0166885 | A2 | 1/1986 |
| EP | 0346925 | A2 | 12/1989 |
| EP | 0368673 | A1 | 5/1990 |
| EP | 0391597 | A2 | 10/1990 |
| EP | 0468688 | A2 | 1/1992 |
| EP | 0642243 | A1 | 3/1995 |
| EP | 0346925 | B1 | 4/1995 |
| EP | 0664621 | | 7/1995 |
| EP | 0664621 | A1 | 7/1995 |
| EP | 0876073 | A2 | 11/1998 |
| EP | 1334630 | B1 | 9/2004 |
| EP | 2290850 | A1 | 3/2011 |
| EP | 1303929 | | 10/2011 |
| EP | 1303929 | B1 | 10/2011 |
| EP | 1570626 | B1 | 11/2013 |
| EP | 2290850 | B1 | 5/2016 |
| EP | 3035562 | A1 | 6/2016 |
| FR | 2345865 | | 10/1977 |
| FR | 2345865 | A1 | 10/1977 |
| GB | 2253770 | A | 9/1992 |
| GB | 2289198 | A | 11/1995 |
| GB | 2300549 | A | 11/1996 |
| GB | 2315959 | A | 2/1998 |
| GB | 2320653 | A | 6/1998 |
| IT | 540424 | | 4/1957 |
| JP | 58-164007 | | 9/1983 |
| JP | 58164007 | A | 9/1983 |
| JP | 3-26031 | | 2/1991 |
| JP | 3026031 | A | 2/1991 |
| JP | 512374 | | 1/1993 |
| JP | 512374 | A | 1/1993 |
| JP | H05153021 | A | 6/1993 |
| JP | H05268128 | A | 10/1993 |
| JP | 6318905 | A | 11/1994 |
| JP | 8510878 | | 11/1996 |
| JP | 11234200 | A | 8/1999 |
| JP | 2002354534 | A | 12/2002 |
| KR | 19990064537 | A | 8/1999 |
| KR | 1020000060899 | A | 10/2000 |
| KR | 1020010018675 | A | 3/2001 |
| KR | 20010048227 | A | 6/2001 |
| KR | 1020010048227 | A | 6/2001 |
| KR | 100594770 | B1 | 6/2006 |
| WO | 9115927 | | 10/1991 |
| WO | 9115927 | A1 | 10/1991 |
| WO | 9428690 | A1 | 12/1994 |
| WO | 9533350 | A1 | 12/1995 |
| WO | 9628946 | A1 | 9/1996 |
| WO | 9705704 | A1 | 2/1997 |
| WO | 9716000 | A1 | 5/1997 |
| WO | 9732442 | A1 | 9/1997 |
| WO | 9824256 | A2 | 6/1998 |
| WO | 9837715 | A2 | 8/1998 |
| WO | 9937035 | A1 | 7/1999 |
| WO | 9948312 | A1 | 9/1999 |
| WO | 0021221 | A1 | 4/2000 |
| WO | 0021337 | A2 | 4/2000 |
| WO | 0156197 | A2 | 8/2001 |
| WO | 0174013 | A2 | 10/2001 |
| WO | 0174100 | A1 | 10/2001 |
| WO | 0209319 | | 1/2002 |
| WO | 0209319 | A1 | 1/2002 |
| WO | 0239624 | A2 | 5/2002 |
| WO | 02067468 | A1 | 8/2002 |
| WO | 2004051322 | | 6/2004 |
| WO | 2004051322 | A2 | 6/2004 |

OTHER PUBLICATIONS

USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01394, Sep. 2, 2021, pp. Cover through 3, Re: U.S. Pat. No. 9,332,402, from U.S. Appl. No. 14/054,223.

USPTO Patent Trial and Appeal Board, "Petition for Inter Partes Review under 37 C.F.R § 42.100" in *SOLiD, Inc.* v. *CommScope Technologies LLC* Inter Partes Review, IPR No. 2021-01390, Dec. 29, 2009, pp. Cover through 116, Re: U.S. Pat. No. 7,639,982, from U.S. Appl. No. 10/740,944.

USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01391, Dec. 29, 2009, pp. Cover through 115, Re: U.S. Pat. No. 7,639,982, from U.S. Appl. No. 10/740,944.

USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01392, Dec. 4, 2012, pp. Cover through 105, Re: U.S. Pat. No. 8,326,218, from U.S. Appl. No. 12/617,215.

USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01393, Nov. 5, 2013, pp. Cover through 72, Re: U.S. Pat. No. 8,577,286, from U.S. Appl. No. 13/662,948.

USPTO Patent Trial and Appeal Board, "Petition for Inter Partes Review under 37 C.F.R § 42.100" in *SOLiD, Inc.* v. *CommScope Technologies LLC* Interpartes Review, IPR No. 2021-01394, May 3, 2016, pp. Cover through 87, Re: U.S. Pat. No. 9,332,402, from U.S. Appl. No. 14/054,223.

USPTO Patent Trial and Appeal Board, Wala, "A New Microcell Architecture Using Digital Optical Transport", cited in *SOLiD, Inc.* v. *CommScope Technologies LLC* Inter Partes Review, IPR Nos. 2021-01390, 2021-01391, 2021-01392, 2021-01393, 2021-01394, Aug. 12, 2021, 26 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.

(56) References Cited

OTHER PUBLICATIONS

Wala, "A New Microcell Architecture Using Digital Optical Transport", 1993, 43rd IEEE Vehicular Technology Conference, Secaucus, NJ, US, May 18-20, 1993, pp. 585 through 588.
Wikipedia, "Free Lossless Audio Codec", Nov. 7, 2021, 7 Page(s), https://de.wikipedia.org/w/index.php?title=Free_Lossless_Audio_Codec&oldid=217065127.
Wikipedia, "Global System for Mobile Communications", Jan. 9, 2019, pp. 1 through 24, Wikipedia.
Wikipedia, "Summation", Dec. 18, 2018, pp. 1 through 11, Wikipedia.
Wikipedia, "T-carrier", Oct. 21, 2018, pp. 1 through 6, Wikipedia.
Wikipedia, "Uplink", May 10, 2019, pp. 1 through 6, https://de.wikipedia.org/w/index.php?title=Uplink&oldid=188425198.
Zhaohui et al., "A Rake Type Receiver Structure for CDMA Mobile Communication Systems Using Antenna Arrays", IEEE, 1996, pp. 528 through 530.
U.S. Patent and Trademark Office, "Notice of Allowance", U.S. Appl. No. 08/204,660, Oct. 2, 1996, pp. 1 through 4, Published: US.
U.S. Patent and Trademark Office, "Notice of Allowance", U.S. Appl. No. 08/299,159, Aug. 19, 1997, pp. 1 through 9, Published: US.
U.S. Patent and Trademark Office, "Notice of Allowance", U.S. Appl. No. 08/410,129, Oct. 17, 1996, pp. 1 through 6, Published: US.
U.S. Patent and Trademark Office, "Notice of Allowance", U.S. Appl. No. 09/619,431, Aug. 12, 2003, pp. 1 through 9, Published: US.
U.S. Patent and Trademark Office, "Notice of Allowance", U.S. Appl. No. 09/747,273, Aug. 8, 2007, pp. 1 through 8, Published: US.
U.S. Patent and Trademark Office, "Notice of Allowance", U.S. Appl. No. 10/395,743, Jun. 4, 2014, pp. 1 through 5, Published: US.
U.S. Patent and Trademark Office, "Notice of Allowance", U.S. Appl. No. 10/395,743, Sep. 12, 2014, pp. 1 through 25, Published: US.
U.S. Patent and Trademark Office, "Notice of Allowance", U.S. Appl. No. 10/740,944, Aug. 13, 2009, pp. 1 through 12, Published: US.
U.S. Patent and Trademark Office, "Notice of Allowance", U.S. Appl. No. 11/937,255, Sep. 17, 2012, pp. 1 through 11, Published: US.
U.S. Patent and Trademark Office, "Notice of Allowance", U.S. Appl. No. 12/617,215, Aug. 2, 2012, pp. 1 through 11, Published: US.
U.S. Patent and Trademark Office, "Notice of Allowance", U.S. Appl. No. 13/662,948, Jul. 3, 2013, pp. 1 through 10, Published: US.
U.S. Patent and Trademark Office, "Notice of Allowance", U.S. Appl. No. 14/054,223, Aug. 14, 2015, pp. 1 through 5, Published: US.
U.S. Patent and Trademark Office, "Notice of Allowance", U.S. Appl. No. 14/054,223, Dec. 22, 2015, pp. 1 through 9, Published: US.
U.S. Patent and Trademark Office, "Notice of Allowance", U.S. Appl. No. 15/144,219, Jul. 17, 2019, pp. 1-13, Published: US.
U.S. Patent and Trademark Office, "Notice of Allowance", U.S. Appl. No. 15/144,219, Nov. 28, 2016, pp. 1 through 5, Published: US.
U.S. Patent and Trademark Office, "Notice of Allowance", U.S. Appl. No. 15/436,605, Apr. 11, 2019, pp. 1-96, Published: US.
U.S. Patent and Trademark Office, "Notice of Allowance", U.S. Appl. No. 15/436,605, Apr. 14, 2022, pp. 1 through 10, Published: US.
U.S. Patent and Trademark Office, "Notice of Allowance", U.S. Appl. No. 15/436,605, May 6, 2021, pp. 1 through 10, Published: US.
U.S. Patent and Trademark Office, "Notice of Allowance", U.S. Appl. No. 15/436,605, Aug. 17, 2022, pp. 1 through 39, Published: US.
U.S. Patent and Trademark Office, "Notice of Allowance", U.S. Appl. No. 15/483,432, Jul. 16, 2019, pp. 1-7, Published: US.
U.S. Patent and Trademark Office, "Notice of Filing Date Accorded to Petition and Time for Filing Patent Owner Preliminary Response", U.S. Pat. No. 7,639,982, Aug. 18, 2021, pp. 1 through 5, Published: US.
U.S. Patent and Trademark Office, "Notice of Intent to Issue Ex Parte Reexamination Certificate", U.S. Appl. No. 90/010,357, Jun. 22, 2010, pp. 1 through 18, Published: US.
U.S. Patent and Trademark Office, "Order Granting / Denying Request For Ex Parte Reexamination", U.S. Appl. No. 90/010,357, Mar. 12, 2009, pp. 1 through 10, Published: US.
U.S. Patent and Trademark Office, "Notice of Intent to Issue Ex Parte Reexamination Certificate", U.S. Appl. No. 90/010,362, Jun. 22, 2010, pp. 1 through 16, Published: US.
U.S. Patent and Trademark Office, "Notice of Intent to Issue Ex Parte Reexamination Certificate", U.S. Appl. No. 90/010,363, Dec. 6, 2010, pp. 1 through 21, Published: US.
U.S. Patent and Trademark Office, "Notice of Panel Decision from Pre-Appeal Brief Review", U.S. Appl. No. 10/395,743, Nov. 9, 2009, pp. 1 through 2, Published: US.
U.S. Patent and Trademark Office, "Office Action in Ex Parte Reexamination", U.S. Appl. No. 90/010,362, Sep. 25, 2009, pp. 1 through 18, Published: US.
U.S. Patent and Trademark Office, "Office Action in Ex Parte Reexamination", U.S. Appl. No. 90/010,363, Sep. 25, 2009, pp. 1 through 32, Published: US.
U.S. Patent and Trademark Office, "Office Action in Ex Parte Reexamination", U.S. Appl. No. 90/010,357, Sep. 25, 2009, pp. 1 through 17, Published: US.
U.S. Patent and Trademark Office, "Office Action", U.S. Appl. No. 08/065,652, May 29, 1995, pp. 1 through 7, Published: US.
U.S. Patent and Trademark Office, "Office Action", U.S. Appl. No. 08/299,159, Jul. 17, 1995, pp. 1 through 5, Published: US.
U.S. Patent and Trademark Office, "Office Action", U.S. Appl. No. 08/204,660, Apr. 4, 1995, pp. 1 through 14, Published: US.
U.S. Patent and Trademark Office, "Office Action", U.S. Appl. No. 08/204,660, Oct. 26, 1995, pp. 1 through 8, Published: US.
U.S. Patent and Trademark Office, "Office Action", U.S. Appl. No. 08/294,742, May 27, 1996, pp. 1-5, Published: US.
U.S. Patent and Trademark Office, "Office Action", U.S. Appl. No. 08/294,742, Oct. 25, 1995, pp. 1 through 6, Published: US.
U.S. Patent and Trademark Office, "Office Action", U.S. Appl. No. 08/299,159, Feb. 19, 1997, pp. 1 through 9, Published: US.
U.S. Patent and Trademark Office, "Office Action", U.S. Appl. No. 08/299,159, Apr. 9, 1996, pp. 1 through 3, Published: US.
U.S. Patent and Trademark Office, "Office Action", U.S. Appl. No. 08/299,159, Oct. 2, 1996, pp. 1 through 2, Published: US.
U.S. Patent and Trademark Office, "Office Action", U.S. Appl. No. 08/410,129, Jan. 23, 1996, pp. 1 through 12, Published: US.
U.S. Patent and Trademark Office, "Office Action", U.S. Appl. No. 09/619,431, Mar. 13, 2003, pp. 1 through 15, Published: US.
U.S. Patent and Trademark Office, "Office Action", U.S. Appl. No. 09/747,273, Oct. 6, 2005, pp. 1 through 10, Published: US.
U.S. Patent and Trademark Office, "Office Action", U.S. Appl. No. 09/747,273, Mar. 30, 2004, pp. 1 through 19, Published: US.
U.S. Patent and Trademark Office, "Office Action", U.S. Appl. No. 10/395,743, Jan. 14, 2010, pp. 1 through 31, Published: US.
U.S. Patent and Trademark Office, "Office Action", U.S. Appl. No. 10/395,743, Jan. 30, 2006, pp. 1 through 15, Published: US.
U.S. Patent and Trademark Office, "Office Action", U.S. Appl. No. 10/395,743, Mar. 28, 2005, pp. 1 through 11, Published: US.
U.S. Patent and Trademark Office, "Office Action", U.S. Appl. No. 10/395,743, Apr. 4, 2007, pp. 1 through 11, Published: US.
U.S. Patent and Trademark Office, "Office Action", U.S. Appl. No. 10/395,743, May 21, 2008, pp. 1-14, Published: US.
U.S. Patent and Trademark Office, "Office Action", U.S. Appl. No. 15/144,219, Aug. 10, 2016, pp. 1 through 35, Published: US.
U.S. Patent and Trademark Office, "Office Action", U.S. Appl. No. 10/395,743, Nov. 15, 2007, pp. 1-16, Published: US.
U.S. Patent and Trademark Office, "Office Action", U.S. Appl. No. 10/395,743, Mar. 18, 2009, pp. 1-23, Published: US.
U.S. Patent and Trademark Office, "Office Action", U.S. Appl. No. 10/395,743, Sep. 1, 2006, pp. 1-12, Published: US.

(56) References Cited

OTHER PUBLICATIONS

U.S. Patent and Trademark Office, "Office Action", U.S. Appl. No. 10/740,944, Feb. 27, 2009, pp. 1 through 25, Published: US.
U.S. Patent and Trademark Office, "Office Action", U.S. Appl. No. 10/740,944, Apr. 3, 2008, pp. 1 through 21, Published: US.
U.S. Patent and Trademark Office, "Office Action", U.S. Appl. No. 10/740,944, Aug. 24, 2006, pp. 1 through 19, Published: US.
U.S. Patent and Trademark Office, "Office Action", U.S. Appl. No. 11/937,255, Feb. 17, 2011, pp. 1 through 13, Published: US.
U.S. Patent and Trademark Office, "Office Action", U.S. Appl. No. 12/617,215, Apr. 11, 2012, pp. 1 through 12, Published: US.
U.S. Patent and Trademark Office, "Office Action", U.S. Appl. No. 13/662,948, Apr. 24, 2013, pp. 1 through 23, Published: US.
U.S. Patent and Trademark Office, "Office Action", U.S. Appl. No. 13/725,866, Jan. 22, 2014, pp. 1 through 28, Published: US.
U.S. Patent and Trademark Office, "Office Action", U.S. Appl. No. 14/054,223, Apr. 29, 2015, pp. 1 through 25, Published: US.
U.S. Patent and Trademark Office, "Office Action", U.S. Appl. No. 15/144,219, Apr. 25, 2018, pp. 1 through 38, Published: US.
U.S. Patent and Trademark Office, "Office Action", U.S. Appl. No. 15/144,219, Apr. 28, 2017, pp. 1 through 24, Published: US.
U.S. Patent and Trademark Office, "Office Action", U.S. Appl. No. 15/436,605, Jan. 22, 2021, pp. 1 through 23, Published: US.
U.S. Patent and Trademark Office, "Office Action", U.S. Appl. No. 15/436,605, Feb. 28, 2018, pp. 1-9, Published: US.
U.S. Patent and Trademark Office, "Office Action", U.S. Appl. No. 15/436,605, Sep. 8, 2021, pp. 1 through 24, Published: US.
U.S. Patent and Trademark Office, "Office Action", U.S. Appl. No. 15/436,605, Oct. 24, 2019, pp. 1-34, Published: US.
U.S. Patent and Trademark Office, "Office Action", U.S. Appl. No. 15/483,432, Oct. 11, 2017, pp. 1-15, Published: US.
U.S. Patent and Trademark Office, "Office Action", U.S. Appl. No. 15/483,432, Dec. 17, 2018, pp. 1-23, Published: US.
U.S. Patent and Trademark Office, "Order Granting / Denying Request for Ex Parte Reexamination", U.S. Appl. No. 90/010,362, Apr. 17, 2009 pp. 1 through 8, Published: US.
U.S. Patent and Trademark Office, "Order Granting / Denying Request for Ex Parte Reexamination", U.S. Appl. No. 90/010,363, Apr. 17, 2009 pp. 1 through 10, Published: US.
U.S. Patent and Trademark Office, "Restriction Requirement", U.S. Appl. No. 08/204,660, Mar. 10, 1995, pp. 1-13, Published: US.
U.S. Patent and Trademark Office, "Restriction Requirement", U.S. Appl. No. 13/725,866, Sep. 10, 2013, pp. 1 through 8, Published: US.
U.S. Patent and Trademark Office, "Supplemental Notice of Allowance", U.S. Appl. No. 14/054,223, Apr. 11, 2016, pp. 1 through 4, Published: US.
USPTO Patent Trial and Appeal Board, "Certified Translation of Korean Patent Application Publication KR2001-0048227 in *SOLiD, Inc.* v. *CommScope Technologies LLC* Inter Partes Review", IPR Nos. 2021-01390, 2021-01391, 2021-01392, 2021-01393, 2021-01394, Aug. 12, 2021, 25 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Decision Settlement Prior to Institution of Trial" in *SOLiD, Inc.* v. *CommScope Technologies LLC* Inter Partes Review, IPR No. 2021-01394, Nov. 22, 2021, pp. 1 through 5, Re: U.S. Pat. No. 9,332,402, From U.S. Appl. No. 14/054,223.
USPTO Patent Trial and Appeal Board, "Decision Settlement Prior to Institution of Trial" in *SOLiD, Inc.* v. *CommScope Technologies LLC* Inter Partes Review, IPR No. 2021-01390, Nov. 22, 2021, pp. 1 through 5, Re: U.S. Pat. No. 7,639,982, From U.S. Appl. No. 10/740,944.
USPTO Patent Trial and Appeal Board, "Decision Settlement Prior to Institution of Trial" in *SOLiD, Inc.* v. *CommScope Technologies LLC* Inter Partes Review, IPR No. 2021-01391, Nov. 22, 2021, pp. 1 through 5, Re: U.S. Pat. No. 7,639,982, From U.S. Appl. No. 10/740,944.
USPTO Patent Trial and Appeal Board, "Decision Settlement Prior to Institution of Trial" in *SOLiD, Inc.* v. *CommScope Technologies LLC* Inter Partes Review, IPR No. 2021-01392, Nov. 22, 2021, pp. 1 through 5, Re: U.S. Pat. No. 8,326,218, From U.S. Appl. No. 12/617,215.
USPTO Patent Trial and Appeal Board, "Decision Settlement Prior to Institution of Trial" in *SOLiD, Inc.* v. *CommScope Technologies LLC* Inter Partes Review, IPR No. 2021-01393, Nov. 22, 2021, pp. 1 through 5, Re: U.S. Pat. No. 8,577,286, From U.S. Appl. No. 13/662,948.
USPTO Patent Trial and Appeal Board, "Declaration of Maria P. Garcia Under 37 C.F.R. § 1.68" in *SOLiD, Inc.* v. *CommScope Technologies LLC* Inter Partes Review, IPR Nos. 2021-01390, 2021-01391, 2021-01392, 2021-01393, 2021-01394, Oct. 6, 2020, 72 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Declaration of R. Jacob Baker, Ph.D. P.E Under 37 C.F.R. § 42.100" in *SOLiD, Inc.* v. *CommScope Technologies LLC* Inter Partes Review, IPR Nos. 2021-01390, 2021-01391, 2021-01392, 2021-01393, 2021-01394, Aug. 11, 2021, 440 Pages, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Joint Motion to Dismiss the Petitions" in *SOLiD, Inc.* v. *CommScope Technologies LLC* Inter Partes Review, IPR Nos. 2021-01390, 2021-01391, 2021-01392, 2021-01393, 2021-01394, Nov. 10, 2021, pp. 1 through 6, Re: U.S. Pat. Nos. 7,639,982, 8,326,218, 8,577,286, and 9,332,402 from U.S. Appl. Nos. 10/740,944, 12/617,215, 13/662,948, and 14/054,223.
USPTO Patent Trial and Appeal Board, "Patent Owner's Mandatory Notices Pursuant to 37 C.F.R § 42.8" in *SOLiD, Inc.* v. *CommScope Technologies LLC* Interpartes Review, IPR No. 2021-01390, Sep. 2, 2021, pp. Cover through 4, Re: U.S. Pat. No. 7,639,982, from U.S. Appl. No. 10/740,944.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01391, Sep. 2, 2021, pp. Cover through 4, Re: U.S. Pat. No. 7,639,982, from U.S. Appl. No. 10/740,944.
USPTO Patent Trial and Appeal Board, "Patent Owner's Mandatory Notices Pursuant to 37 C.F.R § 42.8" in *SOLiD, Inc.* v. *CommScope Technologies LLC* Inter Partes Review, IPR No. 2021-01392, Sep. 2, 2021, pp. Cover through 3, Re: U.S. Pat. No. 8,326,218, from U.S. Appl. No. 12/617,215.
State Intellectual Property Office of People's Republic of China, "Notice of Reexamination" from CN Application No. 200710153587, Jun. 21, 2012, from Foreign Counterpart of U.S. Appl. No. 09/619,431, pp. 1 through 18, Published: CN.
State Intellectual Property Office of People's Republic of China, "Notification to Grant Patent Right for Invention" from CN Application No. 200910005002.9, Aug. 19, 2013, from Foreign Counterpart to U.S. Appl. No. 09/619,431, pp. 1 through 6, Published: CN.
State Intellectual Property Office of People's Republic of China, "Notification to Grant Patent Right for Invention", from CN Application No. 20071053587.X, May 28, 2013, from Foreign Counterpart of U.S. Appl. No. 09/619,431, pp. 1 through 3, Published: CN.
State Intellectual Property Office of People's Republic of China, "Notification to Grant Patent Right for Invention", from CN 200910005002.9, Aug. 19, 2013, from Foreign Counterpart of U.S. Appl. No. 09/619,431, pp. 1 through 6, Published: CN.
State Intellectual Property Office of People's Republic of China, "Notification to Grant Patent Right for Invention", from CN Application No. 200380109396.3, Jun. 29, 2010, from Foreign Counterpart to U.S. Appl. No. 10/395,743, pp. 1 through 4, Published: CN.
State Intellectual Property Office of People's Republic of China, "Office Action" from CN Application No. 01815499.9, Jul. 8, 2005, from Foreign Counterpart to U.S. Appl. No. 09/619,431, pp. 1 through 8, Published: CN.

(56) References Cited

OTHER PUBLICATIONS

State Intellectual Property Office of People's Republic of China, "Office Action" from CN Application No. 200710153587, Nov. 2, 2010, rom Foreign Counterpart of U.S. Appl. No. 09/619,431, pp. 1 through 9, Published: CN.
State Intellectual Property Office of People's Republic of China, "Reexamination Decision Revoking Decision of Rejection" from CN Application No. 200710153587.X, Nov. 30, 2012, from Foreign Counterpart to U.S. Appl. No. 09/619,431, pp. 1 through 14, Published: CN.
State Intellectual Property Office of People's Republic of China, "Second Office Action" from CN Application No. 01815499.9, May 11, 2007, from Foreign Counterpart of U.S. Appl. No. 09/619,431, pp. 1 through 5, Published: CN.
State Intellectual Property Office of People's Republic of China, "Second Office Action" from CN Application No. 200710153587.X, Feb. 4, 2013, from Foreign Counterpart of U.S. Appl. No. 09/619,431, pp. 1 through 7, Published: CN.
State Intellectual Property Office of People's Republic of China, "Second Office Action" from CN Application No. 200910005002.9, Jan. 23, 2013, from Foreign Counterpart of U.S. Appl. No. 09/619,431, pp. 1 through 11, Published: CN.
State Intellectual Property Office of People's Republic of China, "Third Office Action" from CN Application No. 01815499.9, Oct, 26, 2007, from Foreign Counterpart of U.S. Appl. No. 09/619,431, pp. 1 through 8, Published: CN.
Steele, "Towards a high-capacity digital cellular mobile radio system", IEE Proceedings~F, Special Issue on Land Mobile Radio, Aug. 1985, vol. 132, Part F, No. 5, pp. 405-415.
Stern et al., "Passive Optical Local Networks for Telephony Applications and Beyond" Electronics Letters: an International Publication, The Institution of Electrical Engineers, Nov. 19, 1987, vol. 23, No. 24, pp. 1255-1257.
Tang, "Fiber Optic Antenna Remoting for Multi-Sector Cellular Cell Sites", GTE Laboratories, at least as early as 070/9/1993, pp. 1 through 22.
Tang, "Fiber-Optic Antenna Remoting for MultiSector Cellular Cell Sites", GTE Laboratories Incorporated, Jan. 1, 1992, pp. 76 through 81, Published in: US.
TE Connectivity, "Innovative Solution to Cut Costs of Delivering Mobile Ultra-broadband Access", Feb. 20, 2014, https://www.ecnmag.cominews/2014/02/innovative-solution-cut-costs-delivering-mobile-ultra-broadband-access, pp. 1 through 4.
Tektronix, "Synchronous Optical Network (SONET)", International Engineering Consortium, as downloaded on Aug. 28, 2002 from http://www.iec.org/online/tutorials/sonet/topic03.html, pp. 1 through 5.
The International Search Authority, "International Search Report from PCT/US94/05897", "from PCT Counterpart of U.S. Appl. No. 08/204,660", Oct. 31, 1994, pp. 1-7, Published in: WO.
Titch, "Kentrox boosts coverage and capacity", Telephony, Jan. 25, 1993, pp. 11 through-12.
U.S. District Court for the Northern District of Texas Dallas Division, Rebuttal Expert Report of Dr. Anthony Acampora Addressing Validity of CommScope's Asserted Patents, including U.S. Pat. Nos. 9,332,402 (the '402 patent); 8,577,286 (the '286 patent); 8,326,218 (the '218 patent); 7,639,982 (the '982 patent); and 7,848,747 ("the '747 patent"), in *CommScope Technologies* v. *SOLiD Gear, Inc. and SOLiD, Inc.*, Case 3:16-cv-00477-M, 46 Pages, Re: U.S. Appl. Nos. 10/740,944, 12/617,215, 13/662,948, and 14/054,223.
U.S. District Court for the Northern District of Texas, "Complaint for Patent Infringement", in *CommScope Technologies* v. *SOLiD Gear, Inc. and SOLiD, Inc.*, Case 3:16-cv-00477-M, May 18, 2022, pp. 1 through 32, Re: U.S. Pat. Nos. 7,639,982; 8,326,218; 8,877,286; and 9,332,402 from U.S. Appl. Nos. 10/740,944, 12/617,215, 13/662,948, and 14/054,223.
U.S. Patent and Trademark Office, "Advisory Action", U.S. Appl. No. 11/937,255, Nov. 3, 2011, pp. 1 through 2, Published: US.
U.S. Patent and Trademark Office, "Advisory Action", U.S. Appl. No. 15/436,605, Jun. 2, 2020, pp. 1 through 7, Published: US.
U.S. Patent and Trademark Office, "Decision on Appeal", U.S. Appl. No. 10/395,743, Mar. 20, 2014, pp. 1-6, Published: US.
U.S. Patent and Trademark Office, "Examiner's Answer", U.S. Appl. No. 10/395,743, Feb. 4, 2011, pp. 1-29, Published: US.
U.S. Patent and Trademark Office, "Final Office Action", U.S. Appl. No. 08/204,660, Jun. 12, 1996, pp. 1 through 8, Published: US.
U.S. Patent and Trademark Office, "Final Office Action", U.S. Appl. No. 10/395,743, Jul. 21, 2010, pp. 1-23, Published: US.
U.S. Patent and Trademark Office, "Final Office Action", U.S. Appl. No. 10/395,743, Nov. 17, 2008, pp. 1-15, Published: US.
U.S. Patent and Trademark Office, "Final Office Action", U.S. Appl. No. 10/395,743, Aug. 20, 2009, pp. 1-22, Published: US.
U.S. Patent and Trademark Office, "Final Office Action", U.S. Appl. No. 10/395,743, Sep. 1, 2006, pp. 1-12, Published: US.
U.S. Patent and Trademark Office, "Final Office Action", U.S. Appl. No. 10/740,944, Feb. 5, 2007, pp. 1 through 16, Published: US.
U.S. Patent and Trademark Office, "Final Office Action", U.S. Appl. No. 10/740,944, Apr. 25, 2007, pp. 1 through 19, Published: US.
U.S. Patent and Trademark Office, "Final Office Action", U.S. Appl. No. 10/740,944, Jul. 18, 2007, pp. 1 through 21, Published: US.
U.S. Patent and Trademark Office, "Final Office Action", U.S. Appl. No. 10/740,944, Oct. 3, 2007, pp. 1 through 22, Published: US.
U.S. Patent and Trademark Office, "Final Office Action", U.S. Appl. No. 10/740,944, Oct. 14, 2008, pp. 1 through 25, Published: US.
U.S. Patent and Trademark Office, "Final Office Action", U.S. Appl. No. 11/937,255, Aug. 29, 2011, pp. 1 through 14, Published: US.
U.S. Patent and Trademark Office, "Final Office Action", U.S. Appl. No. 15/144,219, Oct. 30, 2017, pp. 1 through 33, Published: US.
U.S. Patent and Trademark Office, "Final Office Action", U.S. Appl. No. 15/144,219, Dec. 4, 2018, pp. 1-59, Published: US.
U.S. Patent and Trademark Office, "Final Office Action", U.S. Appl. No. 15/436,605, Mar. 9, 2020, pp. 1 through 24, Published: US.
U.S. Patent and Trademark Office, "Final Office Action", U.S. Appl. No. 90/010,363, Jun. 23, 2010, pp. 1 through 21, Published: US.
U.S. Patent and Trademark Office, "Final Office Action", U.S. Appl. No. 15/483,432, dated Jun. 4, 2018, pp. 1-88, Published in: US.
U.S. Patent and Trademark Office, "Interview Summary", U.S. Appl. No. 10/395,743, Feb. 22, 2008, pp. 1-3, Published: US.
U.S. Patent and Trademark Office, "Interview Summary", U.S. Appl. No. 10/395,743, Aug. 20, 2008, pp. 1-2, Published: US.
U.S. Patent and Trademark Office, "Interview Summary", U.S. Appl. No. 15/144,219, Nov. 16, 2016, pp. 1-11, Published: US.
U.S. Patent and Trademark Office, "Interview Summary", U.S. Appl. No. 15/144,219, Mar. 26, 2018, pp. 1-13, Published: US.
U.S. Patent and Trademark Office, "Interview Summary", U.S. Appl. No. 15/144,219, Sep. 29, 2017, pp. 1-14, Published: US.
U.S. Patent and Trademark Office, "Interview Summary", U.S. Appl. No. 15/483,432, Mar. 26, 2018, pp. 1-12, Published: US.
IEE, "Electronics Letters an International Publication", Nov. 19, 1987, pp. 1-4, vol. 23, No. 24, Publisher: The Institution of Electrical Engineers.
International Preliminary Examining Authority, "International Preliminary Examination Report", from PCT/US94/05897, May 29, 1995, from PCT Counterpart of U.S. Appl. No. 08/204,660, pp. 1 through 8, Published: WO.
International Preliminary Examining Authority, "International Preliminary Examination Report", from PCT/US/01/21021, Jun. 10, 2002, from PCT Counterpart of U.S. Appl. No. 09/619,431, pp. 1 through 3, Published: WO.
International Preliminary Examining Authority, "International Preliminary Report on Patentability", from Application No. PCT/US03/38302, Dec. 14, 2001, from PCT Counterpart of U.S. Appl. No. 10/395,743, pp. 1 through 10, Published: WO.
International Preliminary Examining Authority, "Notification of Transmittal of International Preliminary Report on Patentability from PCT Application No. PCT/US03/38302", from Foreign Counterpart to U.S. Appl. No. 10/395,743, Dec. 14, 2011, pp. 1-10, Published: US.

(56) References Cited

OTHER PUBLICATIONS

International Preliminary Examining Authority, "Written Opinion" from PCT Application No. PCT/US01/21021, from Foreign Counterpart of U.S. Appl. No. 09/619,431, Mar. 18, 2002, pp. 1-2, Published: WO.
International Preliminary Examining Authority, "Written Opinion", from PCT Application No. PCT/US94/05897, from PCT Counterpart to U.S. Appl. No. 08/204,660, Feb. 14, 1995, pp. 1-7, Published: WO.
International Searching Authority, "International Search Report" from PCT Application No. PCT/US01/21021, Nov. 15, 2001, from Foreign Counterpart of U.S. Appl. No. 09/619,431, pp. 1 through 7, Published: WO.
International Searching Authority, "International Search Report", from PCT Application No. PCT/US03/38302, from PCT Counterpart of U.S. Appl. No. 10/395,743, May 2, 2005, pp. 1-5, Published: WO.
Ishida et al., "A10-GHz 8-b Multiplexer/Demultiplexer Chip Set for the SONET STS-192 System", IEEE Journal of Solid State Circuits, vol. 26, No. 12, Dec. 1991, pp. Cover through 1943.
Ishio et al., "A Two-Way Wavelength-Division-Multiplexing Transmission and Its Application to a Switched TV-Distribution System", "Conference Record, Fourth European Conference on Optical Communication", Sep. 12, 1978, pp. 645 through 665, Publisher: IIC.
Japanese Patent Office, "Notice for Reasons for Rejection", from JP Application No. 6-525837, from foreign counterpart of U.S. Appl. No. 08/204,660, Oct. 14, 2003, pp. 1 through 4, Published: JP.
Jury Verdict, "*Commscope Technologies LLC* V. *Dali Wireless, Inc.* V. *Commscope Connectivity LLC*", No. 3:16-cv-477, "United States District Court for the Northern District of Texas Dallas Division", Jun. 20, 2019, pp. 1-19, Published in: US.
Kobb, "Personal Wireless", IEEE Spectrum, Jun. 1993, vol. 30, No. 6, pp. 4 through 5 and 20 through 25, 8, vol. 30, No. 6, Publisher: IEEE, Published in: US.
Korean Intellectual Property Office, "Decision to Grant from KR Application No. 2005-7010190", from Foreign Counterpart to U.S. Appl. No. 10/395,743, Feb. 2, 2012, pp. 1-7, Published: KR.
Korean Intellectual Property Office, "Final Rejection" from KR2005-7010190, from Counterpart to U.S. Appl. No. 10/395,743, Oct. 31, 2011, pp. 1-4, Published: KR.
Korean Intellectual Property Office, "Office Action", from KR Application No. 2005-7010190, from Foreign Counterpart to U.S. Appl. No. 10/395,743, Sep. 30, 2010, pp. 1-5, Published: KR.
Lee et al., "Intelligent Microcell Applications in PCS", "43rd IEEE Vehicular Technology Conference, Personal Communication—Freedom Through Wireless Technology", May 20, 1993, Secaucus, NJ, USA, pp. Cover through 725, Publisher: Pactel Corporation.
Lewis, "ADC/Kentrox Call Report with Bell Atlantic Mobile, Inc.", Oct. 18, 1992, pp. 1 through 3.
Merrett et al., "A Cordless Access System Using Radio-Over-Fibre Techniques", 41st IEEE Vehicular Technology Conference, Gateway to the Future Technology in Motion, May 22, 1991, pp. Cover through 924.
Microwaves & RF, "Digital transport for cellular", Feb. 1993, p. 1.
Nakatsugawa et al., "Software Radio Base and Personal Stations for Cellular/PCS Systems", IEEE Vehicular Technology Conference Proceedings, May 18, 2000, pp. 617 through 621.
Nullity Action 114950NI934 PL/If against EP 2290850 dated Apr. 3, 2019, pp. 1-107.
Nullity Action 114951NI934 PL/If against EP 1570626 dated Jan. 7, 2019, pp. 1-122.
Oades, "The Linear RF Repeater", ICC '80, 1980 International Conference on Communications, Seattle, WA, US, Jun. 8-12, 1980, pp. 1 through 1, IEEE.
O'Byrne, "TDMA and CDMA in a Fiber-Optic Environment", IEEE 38th Vehicular Technology Conference, Jun. 1992, pp. 727 through 731.
Patent Office P.R. China, "Notice of Grant of Patent Right for Invention" from CN Application 94192782.2, Sep. 29, 2000, from Foreign Counterpart of U.S. Appl. No. 08/204,660, pp. 1 through 4, Published: CN.
Patent Office P.R. China, "Office Action" from CN Application No. 01815499.9, Mar. 7, 2008, from Foreign Counterpart to U.S. Appl. No. 09/619,431, pp. 1 through 8, Published: CN.
Patent Office P.R. China, "Office Action" from CN Application No. 200380109396.3, Jan. 4, 2008, from Foreign Counterpart to U.S. Appl. No. 10/395,743, pp. 1 through 7, Published: CN.
Payne et al., "Single Mode Optical Local Networks", "Globecom '85, IEEE Global Telecommunications Conference", Dec. 2-5, 1985, New Orleans, LA, USA, pp. 1200 through 1206.
Quinn, "The Cell Enhancer", "Vehicular Technology Conference", May 22, 1986, pp. 77 through 83, Publisher: Bell Atlantic Mobile Systems.
Replica to the Nullity Action 114951NI934/If against EP 1570626 dated Oct. 14, 2019, pp. 1-49.
Rosenbloom et al., "Cell Enhancer: Beyond the Outer Limits", pp. 1 through 2.
Russell, "New Microcell Technology Sets Cellular Carriers Free", "Telephony Mar. 1993", 3 Pages, Publisher: ADC Kentrox, Published in: US.
Schneiderman, "Offshore Markets Gain in Size, Competitiveness, Even the Smallest Industry Companies Are Expanding Their Global Buisness", Microwaves and RF, Mar. 1993, vol. 32, No. 3, 8 Pages, Publisher: Penton Publishing, Inc.
Siala et al., "Equalization for Orthogonal Frequency Division Multiplexing System", 1993, pp. 649 through 652, Publisher: IEEE.
State Intellectual Property Office of People's Republic of China, "First Office Action" from CN Application No. 01815499.9, Jul. 8, 2005, from Foreign Counterpart of U.S. Appl. No. 09/619,431, pp. 1 through 8, Published in: CN.
State Intellectual Property Office of People's Republic of China, "First Office Action" from CN Application No. 200710153587, Mar. 19, 2010, from Foreign Counterpart of U.S. Appl. No. 09/619,431, pp. 1 through 7, Published: CN.
State Intellectual Property Office of People's Republic of China, "First Office Action" from CN Application No. 200910005002.9 , Apr. 6, 2012, from Foreign Counterpart of U.S. Appl. No. 09/619,431, pp. 1 through 12, Published: CN.
State Intellectual Property Office of People's Republic of China, "Fourth Office Action" from CN Application No. 01815499.9, Mar. 7, 2007. from Foreign Counterpart of U.S. Appl. No. 09/619,431, pp. 1 through 8, Published: CN.
State Intellectual Property Office of People's Republic of China, "Notice of Grant of Patent Right for Invention" from CN Application No. 01815499.9, from Foreign Counterpart of U.S. Appl. No. 09/619,431, Oct. 24, 2008, pp. 1-4, Published: CN.
ADC Kentrox, "ADC Kentrox Expands RF Technology Base with Acquisition of Waseca Technology Inc.", ADC Kentrox News Release, Jun. 9, 1993, pp. 1 through 2.
ADC Kentrox, "ADC Kentrox Introduces Citycell 824, A Replacement for Conventional Cell Sites; Company's Original Goal Was To Improve Fiber Optic T1 Links Between Cells, MTSOs" Telocator Bulletin, Feb. 1993, pp. 1 through 1, Publisher: CityCell.
ADC Kentrox, "ADC Kentrox Introduces Innovative Wireless Network Access Solution: Cellular Subscribers Offered a New Level of Portable Service" ADC Kentrox News Release Mar. 1, 1993, pp. 1 through 3.
ADC Kentrox, "ADC Kentrox Wireless Systems Group CityCell (TM) 824—A Positioning White Paper", Mar. 1993, pp. 1 through 6, Publisher: CITA Trade Show.
ADC Kentrox, "And Now a Few Words From Your Customers . . . ", Aug. 1, 1992, pp. 1 through 4.
ADC Kentrox, "First Field Trial Results Exceed Expectations, ADC Kentrox and Cellular One Join Force to Provide a New Level of Portable Service", News Release, Mar. 2, 1993, pp. 1 through 2, Publisher: ADC Kentrox, Published in: Portland, OR.
ADC Kentrox, "Photographs of ADC Kentrox City Cell 824 Components", Publication Date Unknown, pp. 1 through 14.
ADC Telecommunications, Wireless Systems Division, "Widen your Horizons to a World of Solutions We're Wherever in the World

(56) References Cited

OTHER PUBLICATIONS

You Need Us to Be.", "ADC Telecommunications, Inc. Advertisement for CityRad Cell Enhancer, CityCell Digital Fiberoptic Microcell, CitySmart Site Diversity System & CityWide", 1994, pp. 1 through 8.
Akos et al., "Direct Bandpass Sampling of Multiple Distinct RF Signals", Jul. 1999, IEEE Transactions on Communications, vol. 47, No. 7, pp. 983 through 988.
Ameritech, "Broadband Optical Transport Digital Microcell Connection Service—Interface and Performance Specifications", Issue 1, Dec. 1993, pp. Cover-26.
Analog Devices, Inc., "Mastering the Mix in Signal Processing", "Mixed-Signal Design Seminar", 1991, p. 3, Publisher: Analog Devices, Inc.
Anaren, "Anaren Microwave Components", pp. 1 through 2.
Annex WRST 14 to the Nullity Action 114950NI934 PL/If against EP 2290850 dated Apr. 3, 2019, pp. 1-50.
Annex WRST 16 to the Nullity Action 114951NI934/If against EP 1570626 dated Jan. 7, 2019, pp. 1-53.
Annex WRST 17 to the Nullity Action 114951NI934/If against EP 1570626 dated Oct. 14, 2019, pp. 1-4.
Annex WRST 18 to the Nullity Action 114951NI934/If against EP 1570626 dated Oct. 14, 2019, pp. 1-6.
Annex WRST 2 to the Nullity Action 114950NI934 PL/If against EP 2290850 dated Apr. 3, 2019, pp. 1-4.
Annex WRST 2 to the Nullity Action 114951NI934/If against EP 1570626 dated Jan. 7, 2019, pp. 1-4.
Annex WRST 3 to the Nullity Action 114950NI934 PL/If against EP 2290850 dated Apr. 3, 2019, pp. 1-2.
Annex WRST 3 to the Nullity Action 114951NI934/If against EP 1570626 dated Jan. 7, 2019, pp. 1-3.
Annex WRST 4 to the Nullity Action 114950NI934 PL/If against EP 2290850 dated Apr. 3, 2019, pp. 1-6.
Anon, "2 GHz Repeater Built Without I-F", "Microwaves", Jun. 1976, 2 pages, vol. 15, No. 6, Publisher: Hayden Publishing Company Inc.
Brazilian National Institute of Industrial Property, "Technical Examination Report for BR Application No. PI0112653-9", from Foreign Counterpart to U.S. Appl. No. 09/619,431, Apr. 17, 2018, pp. 1-6, Published in: BR.
Brazilian Patent Office, "Office Action for Brazil Application No. PI0112653-9", "from Foreign Counterpart to U.S. Appl. No. 09/619,431", Apr. 8, 2015, pp. 1-14, Published in: BR.
Brazilian Patent Office, "Office Action from BR Application No. PI0112653-9", from Foreign Counterpart to U.S. Appl. No. 09/619,431, Jan. 8, 2016, pp. 1 through 7, Published: BR.
Brunner et al., "On Space-Time Rake Receiver Structures for WCDMA", 1999, IEEE, pp. 1546 through 1551.
Cellular Industry, The Day Group, "New Signal Transport Technology Digitizes the Cellular Band", Dec. 22, 2000, pp. 2-3.
Cheun, "Performance of Direct-Sequence Spread-Spectrum RAKE receivers with Random Spreading Sequences", IEEE Transactions on Communications, vol. 45, No. 9, Sep. 1997, pp. 1130 through 1143.
City Cell, "CityCell 824 Host-Site User Manual", Sep. 25, 1993, 65-61002101 Issue 1, pp. Cover through 8-34.
City Cell, "CityCell 824 Remote-Site Manual", Preliminary Version, Feb. 1, 1993, pp. Cover through E-2.
City Cell, Cellular Industry, the Day Group, "ADC Kentrox CityCell Field Trial Yields Another First: Simultaneous Analog and Digital Calls", prior to Dec. 22, 2000, 1 page.
Citycell, "ADC Kentrox Introduces Citycell 824, A Replacement for Conventional Cell Sites; Company's Original Goal Was To Improve Fiber Optic T1 Links Between Cells, MTSOs", Telocator Bulletin, Feb. 1993, pp. 1 through 1.
Commscope, "CommScope Completes Transformational Acquisition of TE Connectivity's Telecom, Enterprise and Wireless Businesses", Aug. 28, 2015, pp. 1-4.
Cox, "A Radio System Proposal for Widespread Low-Power Tetherless Communications", IEEE Transactions on Communications, Feb. 1991, pp. Cover through 335, vol. 39, No. 2, IEEE.
Crofut, "Remote monitoring of wireless base stations", Urgent Communications, Jun. 1, 1998, http://urgentcomm.com/print/mag/remote-monitoring-wireless-base-stations, pp. 1 through 4.
Cyr et al., "The digital age is here—Digital radio frequency transport enhances cellular network performance", Telephony, Jul. 5, 1993, pp. 20 through 24.
Dali Wireless, Inc.'s Preliminary Invalidity Contentions to Commscope Technologies LLC—Exhibit A, "*Commscope Technologies LLC* V. *Dali Wireless, Inc.* V *Commscope Connectivity LLC*", United States District Court for the Northern District of Texas Dallas Division, Mar. 13, 2017, pp. 1 through 27, No. 3:16-cv-477, Published: US.
Dali Wireless, Inc.'s Preliminary Invalidity Contentions to Commscope Technologies LLC—Exhibit B, "*Commscope Technologies LLC* V. *Dali Wireless, Inc.* V *Commscope Connectivity LLC*", United States District Court for the Northern District of Texas Dallas Division, Mar. 13, 2017, pp. 1 through 200, No. 3:16-cv-477, Published: US.
Dali Wireless, Inc.'s Preliminary Invalidity Contentions to Commscope Technologies LLC—Exhibit D, "*Commscope Technologies LLC* V. *Dali Wireless, Inc.* V *Commscope Connectivity LLC*", United States District Court for the Northern District of Texas Dallas Division, Mar. 13, 2017, pp. 1 through 613, No. 3:16-cv-477, Published: US.
Dali Wireless, Inc.'s Preliminary Invalidity Contentions to Commscope Technologies LLC—Exhibit C, "*Commscope Technologies LLC* V. *Dali Wireless, Inc.* V *Commscope Connectivity LLC*", United States District Court for the Northern District of Texas Dallas Division, Mar. 13, 2017, pp. 1 through 410, No. 3:16-cv-477, Published: US.
Dali Wireless, Inc.'s Preliminary Invalidity Contentions to Commscope Technologies LLC—Exhibit E, "*Commscope Technologies LLC* V. *Dali Wireless, Inc.* V *Commscope Connectivity LLC*", United States District Court for the Northern District of Texas Dallas Division, Mar. 13, 2017, pp. 1 through 482, No. 3:16-cv-477, Published: US.
Dali Wireless, Inc.'s Preliminary Invalidity Contentions to Commscope Technologies LLC—Exhibit F, "*Commscope Technologies LLC* V. *Dali Wireless, Inc.* V *Commscope Connectivity LLC*", United States District Court for the Northern District of Texas Dallas Division, Mar. 13, 2017, pp. 1 through 573, No. 3:16-cv-477, Published: US.
Dali Wireless, Inc.'s Preliminary Invalidity Contentions to Commscope Technologies LLC, "*Commscope Technologies LLC* V. *Dali Wireless, Inc.* V. *Commscope Connectivity LLC*", "United States District Court for the Northern District of Texas Dallas Division", Mar. 13, 2017, pp. 1-23, No. 3:16-cv-477, Published in: US.
Zonemaster, "Maximum Coverage for High-Capacity Locations", "Decibel Products", 1993, pp. 1-4, Publisher: Decibel Multimedia Microcell System.
Derneryd et al., "Adaptive base-station antenna arrays", Ericsson Review No. 3, 1999, pp. 132 through 137.
Detreville et al., "A Distributed Experimental Communications System", IEEE Journal on Selected Areas in Communications, vol. SAC-1, No. 6, Dec. 1983, pp. Cover through 1075.
Ericksson, "Advertisement by Ericksson", "Telephony", 1994, pp. 1 through 1.
European Patent Office, "Communication pursuant to Article 94(3)" from Application No. 03790242.6, from Foreign Counterpart of U.S. Appl. No. 09/619,431, Feb. 11, 2009, pp. 1 through 4, Published: EP.
European Patent Office, "Communication pursuant to Article 96(2) from EP Application No. 03790242.6", "from Foreign Counterpart of U.S. Appl. No. 10/395,743", Jul. 24, 2007, pp. 1-4.
High Court of Justice Business and Property Courts of England and Wales Intellectual Property List (ChD) Patent Court, Case No. HP-2020-000017, "Amended Particulars of Infringement by Order of Mr Justice Meade dated Jul. 23, 2021", Aug. 6, 2021, pp. B1/7

(56) References Cited

OTHER PUBLICATIONS through B1/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Defence and Amended Counterclaim", Aug. 20, 2021, pp. B1/13 through B1/22, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 6", pp. B3/54 through B3/61, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 5", pp. B3/49 through B3/53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 7", pp. B3/62 through B3/64, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 8", pp. B3/65 through B3/66, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 9", pp. B3/67 through B3/68, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 1", pp. B3/70 through B3/193, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 2", pp. B3/194 through B3/261, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defence and Counterclaim Annex 3", pp. B3/262 through B3/266, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 1 to the Reply and Defence to Counterclaim", pp. B3/267 through B3/272, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 2 to the Reply and Defence to Counterclaim", pp. B3/273 through B3/281, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex 3 to the Reply and Defence to Counterclaim", pp. B2/282 through B2/289, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "First Expert Report of Dr Anthony Acampora", Oct. 22, 2021, pp. C1-2 through C1-65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex A to the First Expert Report of Dr Anthony Acampora Supplemented Technical Primer", Oct. 22, 2021, pp. C1-66 through C1-90, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Third Expert Report of Dr Anthony Acampora", Nov. 25, 2021, pp. C1-112 through C1-119 , Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Second Expert Report of Dr Anthony Acampora", Nov. 12, 2021, pp. C1-94 through C1-111, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-1 to the First Expert Report of Dr Anthony Acampora", Oct. 22, 2021, pp. C2-2 through C2-46, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-3 to the First Expert Report of Dr Anthony Acampora", Oct. 22, 2021, pp. C2-51 through C2-62, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-2 to the First Expert Report of Dr Anthony Acampora", Oct. 22, 2021, pp. C2-47 through C2-50, Re: EP(UK) 2 290 850 and EP(UK) 1 570 626 issued from Foreign Counterparts to U.S. Appl. No. 09/619,431 and 10/395,743.
High Court of Justice Business and Property Courts of England and Wales Intellectual Property List (ChD) Patent Court, Case No. HP-2020-000017, "Exhibit AA-4 to the First Expert Report of Dr Anthony Acampora", Oct. 22, 2021, pp. C2-63 through C2-70, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-5 to the First Expert Report of Dr Anthony Acampora", Oct. 22, 2021, pp. C2-71 through C2-75, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-6 to the First Expert Report of Dr Anthony Acampora", Oct. 22, 2021, pp. C2-76 through C2-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-8 to the First Expert Report of Dr Anthony Acampora", Oct. 22, 2021, pp. C2-88 through C2-96, Re: EP(UK) 2 290 850 and EP(UK) 1 570 626 issued from Foreign Counterparts to U.S. Appl. Nos. 09/619,431 and 10/395,743.

(56) References Cited

OTHER PUBLICATIONS

High Court of Justice Business and Property Courts of England and Wales Intellectual Property List (ChD) Patent Court, Case No. HP-2020-000017, "Exhibit AA-7 to the First Expert Report of Dr Anthony Acampora", Oct. 22, 2021, pp. C2-83 through C2-87, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AA-9 to the Second Expert Report of Dr Anthony Acampora", Nov. 12, 2021, pp. C2-97 through C2-122, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Third Expert Report of Professor Alwyn John Seeds", Nov. 22, 2021, pp. D1-73 through D1-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "First Expert Report of Professor Alwyn John Seeds", Oct. 22, 2021, pp. D1-2 through D1-51, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-1 to the First Expert Report of Professor Alwyn John Seeds", Oct. 22, 2021, pp. D2-2 through D2-5, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-2 to the First Expert Report of Professor Alwyn John Seeds", Oct. 22, 2021, pp. D2-6 through D2-53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-4 to the First Expert Report of Professor Alwyn John Seeds", Oct. 22, 2021, pp. D2-80 through D2-92, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-3 to the First Expert Report of Professor Alwyn John Seeds", Oct. 22, 2021, pp. D2-54 through D2-79, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-5 to the First Expert Report of Professor Alwyn John Seeds", Oct. 22, 2021, pp. D2-93 through D2-108, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-6 to the First Expert Report of Professor Alwyn John Seeds", Oct. 22, 2021, pp. D2-109 through D2-110, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-8 to the First Expert Report of Professor Alwyn John Seeds", Oct. 22, 2021, pp. D2-113 through D2-114, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-9 to the First Expert Report of Professor Alwyn John Seeds", Oct. 22, 2021, pp. D2-115 through D2-116, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-10 to the First Expert Report of Professor Alwyn John Seeds", Oct. 22, 2021, pp. D2-117 through D2-118, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-12 to the First Expert Report of Professor Alwyn John Seeds", Oct. 22, 2021, pp. D2-121 through D2-122, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-11 to the First Expert Report of Professor Alwyn John Seeds", Oct. 22, 2021, pp. D2-119 through D2-120, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-15 to the Third Expert Report of Professor Alwyn John Seeds", Nov. 22, 2021, pp. D2-142 through D2-153, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-16 to the Third Expert Report of Professor Alwyn John Seeds", Nov. 22, 2021, pp. D2-154 through D2-160, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-18 to the Third Expert Report of Professor Alwyn John Seeds", Nov. 22, 2021, pp. D2-171 through D2-175, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-17 to the Third Expert Report of Professor Alwyn John Seeds", Nov. 22, 2021, pp. D2-161 through D2-170, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-19 to the Third Expert Report of Professor Alwyn John Seeds", Nov. 22, 2021, pp. D2-176 through D2-179, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-21 to the Third Expert Report of Professor Alwyn John Seeds", Nov. 22, 2021, pp. D2-190 through D2-200, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-20 to the Third Expert Report of Professor Alwyn John Seeds", Nov. 22, 2021, pp. D2-180 through D2-189, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-23 to the Third Expert Report of Professor Alwyn John Seeds", Nov. 22, 2021, pp. D2-207 through D2-235, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-22 to the Third Expert Report of Professor Alwyn John Seeds", Nov. 22, 2021, pp. D2-201 through

(56) References Cited

OTHER PUBLICATIONS

D2-206, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 1", Dec. 7, 2021, pp. T/2 through T/48, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 2", Dec. 8, 2021, pp. T/54 through T/99, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 3", Dec. 9, 2021, pp. T/109 through T/162, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Proceedings Day 4", Dec. 14, 2021, pp. 1 through 53, Re: EP(UK) 2 290 850 and EP(UK) 1 570 626 issued from Foreign Counterparts to U.S. Appl. Nos. 09/619,431 and U.S. Appl. No. 10/395,743.
High Court of Justice Business and Property Courts of England and Wales Intellectual Property List (ChD) Patent Court, Case No. HP-2020-000017, Documents Provided by the Defendant for Cross Examination—XX-AA1, including Butterweck et al., "Finite wordlength effects in digital filters: a review", Jan. 1, 1988, EUT report. E, Fac. of Electrical Engineering; vol. 88-E-205, Eindhoven University of Technology, Netherlands, pp. XX-AA/2 through XX-AA/99, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA2, including Acampora, "An Introduction to Broadband Networks, LANs, Mans, ATM, B-ISDN, and Optical Networks for Integrated Multimedia Telecommunications", (c) 1994 Springer Science+Business Media New York, pp. XX-AA/100 through XX-AA/108, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA4, including Gregson, "LCG Gains Patent on LGCell Antenna" RCR Wireless News, Apr. 13, 1998, p. XX-AA/126, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA5, Dagoni, "The lobbyist, the US Representative, and the Israeli Company", Globes, Oct. 20, 2005, pp. XX-AA/127 through XX-AA/130, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA7, WDD, "Designing Distributed Antenna Systems (DAS) Considerations, challenges, and what to expect when designing and deploying DAS.", (c) 2016, Advantage Business Media, pp. XX-AA/139 through XX-AA/153, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA9, OFCOM, "Citizens' Band (CB) radio spectrum use—information and operation", Mar. 2018, pp. XX-AA/173 through XX-AA/181, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA10, United States District Court for the Northern District of Texas Dallas Division, "Rebuttal Expert Report of Dr. Anthony Acampora", pp. XX-AA/182 through XX-AA/572, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA11, Dukda, "Introduction to Structured Cabling", Division of Information Technology, Ministry of Communication, Sep. 2000, pp. XX-AA/573 through XX-AA/600, Re: EP(UK) 2 290 850 and EP (UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA12, cleeCOMcen, "History of CV Radio", downloaded Dec. 1, 2021 from www.cleecomcen.co.uk/history-of-cb-radio/, pp. XX-AA/601 through XX-AA/605, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA13, Ghayas, "What Frequency Was Used by IS-95 (CdmaONE)?", downloaded Apr. 12, 2021 from https://commsbrief.com/what-frequency-was-used-by-cdmaone/, pp. XX-AA/606 through XX-AA/612, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA14, Wireless Networks Online, "LGCell(TM) Wireless Network System", downloaded Nov. 19, 2021 from https://www.wirelessnetworksonline.com/doc/lgcell-wireless-network-system-0004, p. XX-AA/613, Re: EP(UK) 2 290 850 and EP(UK) 1 570 626.
High Court of Justice Business and Property Courts of England and Wales Intellectual Property List (ChD) Patent Court, Case No. HP-2020-000017, Documents Provided by the Defendant for Cross Examination—XX-AA16, "4×200 KHz Sub Chanels", p. XX-AA/615, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-1, "Oh Forward Path", p. XX-AJS/2, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-2, Al-Rawshidy et al., "Radio over Fiber Technologies for Mobile Communication Networks", May 9, 2002, (c) 2002 Artech House, Inc. pp. XX-AJS/3 through XX-AJS/60, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Grounds of Invalidity", Aug. 26, 2020, pp. B1/23 through B1/27, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No.

(56) References Cited

OTHER PUBLICATIONS

HP-2020-000017, "Amended Reply and Defence to Counterclaim", Aug. 6, 2021, pp. B1/28 through B1/31, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Statement of Case on Invalidity" Aug. 20, 2021, pp. B1/33 through B1/46, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Claimant's Notice of discontinuance" Sep. 22, 2021, pp. B1/47, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Defendant's Notice of discontinuance", Sep. 24, 2021, pp. B1/48, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of Birss J" Oct. 29, 2020, pp. B1/49 through B1/53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Confidentiality Order (by Consent) by Smith J", Jun. 6, 2021, pp. B1/54 through B1/60, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of Meade J", Jul. 23, 2021, Page(s) B1/61 through B1/65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Consent Order of HHJ Hacon", Sep. 21, 2021, pp. B1/66 through B1/67, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Order of HHJ Hacon", Sep. 28, 2021, pp. B1/68 through B1/70, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Technical Primer", Jul. 16, 2021, pp. B1/71 through B1/83, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Order of Mellor J", Nov. 23, 2021, pp. B1/84 through B1/90, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Claim Annex C", pp. B3/2 through B3/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 1", pp. B3/13 through B3/30, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 2", pp. B3/31 through B3/34, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Particulars of Infringement Annex 3", pp. B3/35 through B3/47, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR2001-0048227, pp. A3-36 through A3-43, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR2001-0048227, pp. A3-44 through A3-53, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR10-2001-0018675, pp. A3-54 through A3-65, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR10-2001-0018675, pp. A3-66 through A3-82, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Korean Patent Application Publication KR1999-0064537, pp. B2/2 through B2/12, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Certified Translation of Korean Patent Application Publication KR1999-0064537, pp. B2/13 through B2/24, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Claimant for Cross Examination—XX-AJS-3, including European Patent EP 1 334 630 B1, Sep. 22, 2004, pp. XX-AJS/62 through XX-AJS/75, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Exhibit AJS-7 to the First Expert Report of Professor Alwyn John Seeds", Oct. 22, 2021, pp. D2-111 through D2-112, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA6, including annotated U.S. Pat. No. 7,848,747 B2, Dec. 7, 2010, pp. XX-AA/131 through XX-AA/138, Re:

(56) References Cited

OTHER PUBLICATIONS

EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, Documents Provided by the Defendant for Cross Examination—XX-AA8, including U.S. Pat. No. 9,332,402 B2, May 3, 2016, pp. XX-AA/154 through XX-AA/172, Re: EP(UK) 2 290 850 and EP(UK) 1 570 626 issued from Foreign Counterparts to U.S. Appl. Nos. 09/619,431 and U.S. Appl. No. 10/395,743.
High Court of Justice Business and Property Courts of England and Wales Intellectual Property List (ChD) Patent Court, Neutral Citation No. [2022] EWHC 769 (Pat), Case No. HP-2020-000017, Apr. 1, 2022, "Comptroller Comments re: EP(UK) 1 570 626 B1", from EP Application No. 03790242.6 from Foreign Counterpart to U.S. Appl. No. 09/619,431, Oct. 26, 2021, pp. A3/106 through A3/109, Published: GB.
Hoberecht, "A Layered Network Protocol for Packet Voice and Data Integration", IEEE Journal on Selected Areas In Communications, vol. SAC-1, No. 6, Dec. 1983, pp. Cover through 1013.
Horowitz, "Digital Electronics", "Chapter 8: Basic Logic Concepts", "The Art of Electronics", 1980, p. 316, Publisher: Press Syndicate of the University of Cambridge.
European Patent Office, "Office Action EP Application No. 01950794.6", "from Foreign Counterpart of U.S. Appl. No. 09/619,431", Feb. 24, 2006, pp. 1-5, Published in: EP.
European Patent Office, "Communication under Rule 71(3)—Reissued" from EP Application No. 10011450.3, from Foreign Counterpart of U.S. Appl. No. 09/619,431, Jan. 26, 2016, pp. 1 through 37, Published in: EP.
European Patent Office, "Communication under Rule 71(3) EPC for EP Application No. 01950794.6", "from Foreign Counterpart of U.S. Appl. No. 09/619,431", May 3, 2011, pp. 1-5, Published in: EP.
European Patent Office, "Communication under Rule 71(3) for EP Application No. 03790242.6", "foreign Counterpart to U.S. Appl. No. 10/395,743", May 14, 2013, pp. 1-27.
European Patent Office, "Communication under Rule 71(3) from EP Application No. 10011450.3 dated Aug. 11, 2015", from Foreign Counterpart to U.S. Appl. No. 09/619,431, Aug. 11, 2015, pp. 1-40, Published: EP.
European Patent Office, "Communication under Rule 71(3)", from EP Application No. 10011450.3, from Foreign Counterpart of U.S. Appl. No. 09/619,431, Jul. 14, 2015, pp. 1 through 39, Published in: EP.
European Patent Office, "European Office Action for Application Serial No. 10011450.3", "from Foreign Counterpart of U.S. Appl. No. 09/619,431", Jan. 16, 2015, pp. 1-4, Published in: EP.
European Patent Office, "Extended European Search Report from EP Application No. 10011450.3", "from Foreign Counterpart of U.S. Appl. No. 09/619,431", Jan. 14, 2011, pp. 1-9, Published in: EP.
European Patent Office, "Extended European Search Report", from EP Application No. 15020262.0, from Foreign Counterpart of U.S. Appl. No. 09/619,431, May 16, 2020, pp. 1 through 8, Published: EP.
European Patent Office, "Office Action for EP Application No. 03790242.6", "from Foreign Counterpart of U.S. Appl. No. 10/395,743", Feb. 11, 2009, pp. 1-4, Published in: EP.
European Patent Office, "Office Action from EP Application No. 01950794.6", "from Foreign Counterpart of U.S. Appl. No. 09/619,431", Mar. 6, 2007, pp. 1-4, Published in: EP.
European Patent Office, "Office Action from EP Application No. 01950794.6", "from Foreign Counterpart of U.S. Appl. No. 09/619,431", Nov. 16, 2010, pp. 1-4, Published in: EP.
European Patent Office, "Summons to Attend Oral Proceedings from EP Application No. 01950794.6", "from Foreign Counterpart of U.S. Appl. No. 09/619,431", filed May 21, 2010, pp. 1-6, Published in: EP.
Federal Patent Court, "Replica to the invalidity matter 6Ni21/19 against EP 2290850 dated Dec. 20, 2019", pp. 1 through 53, Published: DE.
Federal Patent Court, "Statement of Reply including Annex MB1 in the Nullity Action from EP Patent No. 1570626 mailed Jul. 31, 2019", from Foreign Counterpart to U.S. Appl. No. 10/395,743, pp. 1-57, Published: DE.
Federal Patent Court, "Statement of Reply including Annexes MB1 and MB2 in the Nullity Action from EP Application No. 2290850 mailed Sep. 13, 2019", from Foreign Counterpart to U.S. Appl. No. 09/619,431, pp. 1-149, Published: DE.
Foxcom Wireless, "Litenna In-Building RF Distribution System", White Paper, 1998, Document No. 42-14-001-09C, pp. 1 through 8.
Foxcom Wireless, Application Note, "RFiber(TM)—RF Fiberoptic Links for Wireless Applications", 1998, Document No. 41-14-001-10E, pp. 3 through 11.
German Federal Patent Court, "SOLid Inc.'s Nullity Action from EP Patent No. 1570626", from Foreign Counterpart to U.S. Appl. No. 10/395,743, May 11, 2021, pp. 1-114, Published: DE.
German Federal Patent Court, "Anlage NK 3 in the Nullity Action from EP Patent No. 2 290 850 (DE 601 49 927)", Mar. 3, 2021, pp. 1-2, from Foreign Counterpart to U.S. Appl. No. 09/619,431.
German Federal Patent Court, "Anlage NK 4 in the Nullity Action from EP Patent No. 2 290 850 (DE 601 49 927)", Mar. 3, 2021, pp. 1-2, from Foreign Counterpart to U.S. Appl. No. 09/619,431.
German Federal Patent Court, "Grounds of Objection to SOLiD Inc.'s Nullity Action from EP Patent No. 2 290 850 (DE 601 49 927)", Nov. 12, 2021, pp. 1-104, from Foreign Counterpart to U.S. Appl. No. 09/619,431.
German Federal Patent Court, "SOLiD Inc.'s Nullity Action from EP Patent No. 2 290 850 (DE 601 49 927)", Mar. 3, 2021, pp. 1-108, from Foreign Counterpart to U.S. Appl. No. 09/619,431.
German Federal Patent Court, "SOLiD Inc.'s Reply in the Nullity Action from EP Patent No. 2 290 850 (DE 601 49 927)", Feb. 11, 2022, pp. 1-41, from Foreign Counterpart to U.S. Appl. No. 09/619,431.
German Federal Patent Court, "Grounds for Objection to SOLiD Inc.'s Nullity Action from EP Patent No. 1 570 626 (DE 603 45 256)", Sep. 14, 2021, pp. 1 through 112, from Foreign Counterpart to U.S. Appl. No. 09/619,431.
Grace, "Synchronous Quantized Subcarrier Multiplexing for Transport of Video, Voice and Data", "IEEE Journal on Selected Areas in Communications", Sep. 1990, vol. 8, No. 7, pp. 1351-1358.
Graf, "Modern Dictionary of Electronics—Seventh Edition", 1999, pp. 1 through 9.
Grundmann et al., "An Empirical Comparison of a Distributed Antenna Microcell System Versus a Single Antenna Microcell System for Indoor Spread Spectrum Communications at 1.8 Ghz", "ICUPC '93", 1993, pp. 59 through 63.
GTE Laboratories, "Urban Microcell System Layout", GTE Laboratories Conference, Jun. 14-18, 1992, pp. 1-13.
Gupta et al., "Land Mobile Radio Systems—A Tutorial Exposition", IEEE Communications Magazine, Jun. 1985, vol. 23, No. 6, pp. 34-45.
Haas et al., "A Mode-Filtering Scheme for Improvement of the Bandwidth-Distance Product in Multimode Fiber Systems", Journal of Lightwave Technology, vol. 11, No. 7, Jul. 1993, pp. 1125 through 1131.
Harvey et al., "Cordless Communications Utilising Radio Over Fibre Techniques for the Local Loop", "IEEE International Conference on Communications", Jun. 1991, pp. 1171 through 1175.
High Court of Justice Business and Property Courts of England and Wales Intellectual Property List (ChD) Patent Court, Case No. HP-2020-000017, "Indexes", pp. 1 through 14, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Approved Judgment", Apr. 1, 2021, pp. 1 through 64, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No.

(56) References Cited

OTHER PUBLICATIONS

HP-2020-000017, "Application Notice", Sep. 1, 2021, pp. A2/49 through A2/52, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Statement of Reasons for Amendment of EP (UK) 2290850 B1", pp. A2/53 through A2/60, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Notice and Statement of Grounds of Opposition", Oct. 12, 2021, pp. A2/61 through A2/64, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Comptroller Comments", Oct. 26, 2021, pp. A2/65 through A2/68, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Application Notice", Sep. 1, 2021, pp. A3-83 through A3-86, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Statement of Reasons for Amendment of EP(UK) 1,570,626 B1", pp. A3-87 through A3-92, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Annex D to the First Expert Report of Dr Anthony Acampora", Oct. 22, 2021, pp. A3-93 through A3-105, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Application Notice", pp. A3/110 through A3/112, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Comptroller Comments re: EP(UK) 1 570 626 B1", Oct. 26, 2021, pp. A3/106 through A3/109, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Fourth Expert Report of Dr Anthony Acampora", Dec. 1, 2021, pp. A3-113 through A3-116, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Claim Form by Order of Mr Justice Meade dated Jul. 23, 2021", pp. B1/2 through B1/3, Re: EP(UK) 2 290 850 and EP(UK) 1 570 626 issued from Foreign Counterparts to U.S. Appl. Nos. 09/619,431 and 10/395,743.
High Court of Justice Business and Property Courts of England and Wales Intellectual Property List (ChD) Patent Court, Case No. HP-2020-000017, "Amended Particulars of Claim by Order of Mr Justice Meade dated Jul. 23, 2021", Aug. 6, 2021, pp. B1/4 through B1/6, Re: EP(UK) 2 290 850 and EP(UK) 1 570 626 issued from Foreign Counterparts to U.S. Appl. Nos. 09/619,431 and 10/395,743.
ADC Kentrox.COPYRGT. A Subsidiary of ADC Telecommunications, Inc. "And now a few words from your Customers . . . ", Aug. 1992 (4 pages).
ADC Kentrox, News Release, "ADC Kentrox Introduces Innovative Wireless Network Access Solution Cellular Subscribers Offered a New Level of Portable Services," Mar. 1, 1993 (3 pages).
ADC Kentrox, News Release, "First Field Trial Results Exceeds Expectations," Mar. 2, 1993 (2 pages).
ADC Kentrox Wireless Systenr Group CityCell.TM. 824—A Positioning White paper, (Mar. 1993) CITA Trade Show.
ADC Kentrox Call Report, Oct. 18, 1992, call date Oct. 12, 1992, re: Bell Atlantic Mobile, Inc.
Akos et al., Jul. 1999, IEEE Transactions on Communications, 47:983-988, Direct Bandpass Sampling of Multiple Distinct RF Signals.
Ameritech, "Broadband Optical Transport Digital Microcell Connection Service—Interface and Performance Specifications. A technical descriptionof the User-Network Interface and Performance Specifications,"AM TR-NIS 000117, (pp. 1-26), Issue 1, Dec. 1993.
Cellular Industry, The Day Group, "New Signal Transport Technology Digitizes the Cellular Band," 2 pages, (prior to Dec. 22, 2000).
Cox "A Radio System Proposal for Widespread Low-Power Tetherless Communications," IEEE Transactions on Communications, vol. 39(2), Feb. 1991, pp. 324-335.
Electronic Letters, an International Publication, Nov. 19, 1987, vol. 23 No. 24, pp. 1255-1257.
1998 Foxcom Wireless Proprietary Information, pp. 1-8, "Litenna In-Building RF Distribution System."
Gupta et al., "Land Mobile Radio Systems—A Tutorial Exposition", IEEE Communications Magazine, vol. 23(6), Jun. 1985, p. 37.
Ishio et al., "A Two-Way Wavelength-Division-Multiplexing Transmission and its Application to a Switched TV Distribution System," Electrical Communication Laboratories, Nipon Telegrah & Telephone Public Corporation, Yokosuka, Japan and Technical Bureau, Nippon Telegraph & Telephone Public Corporation, Tokyo, Japan, (10 pages) (prior to Dec. 22, 2000).
Kobb, "Personal Wireless," Special Report/Communications, IEEE Spectrum, Jun. 1993, pp. 20-25.
Lee et al., 1993 43rd IEEE Vehicular Technology Conference, May 18-20, 1993, Personal Communication—Freedom Through Wireless Technology, PacTel Corporation, published May 18, 1993, "Intelligent Microcell Applications in PCS," pp. 722-725.
Merrett et al., 41st IEEE Vehicular Technology Conference, May 19-22, 1991, Gateway to the Future Technology, 91CH2944-7, British Telecom Research Laboratories, "A Cordless Access System Using Radio-Over-Fibre Techniques," pp. 921-924.
Miicrowaves & RF, "Digital Transport for Cellular," Feb. 1993.
O'Byrne, Vehicular Technology Society 42nd VTS Conference Frontiers of Technology, From Pioneers to the 21st Century, GTE Laboratories Incorporated, "TDMA and CDMA in a Fiber-Optic Environment," vol. 2 of 2, pp. 727-731 (May 10, 1992).
Payne et al., "Single Mode Optical Local Networks", Globecom '85, IEEE Global Telecommunications Conference, Dec. 2-5, 1985, pp. 1201-1205.
Quinn, "The Cell Enhancer", Bell Atlanttic Mobile Systems, pp. 77-83.
Russell, New Microcell Technology Sets Cellular Carriers Free, Telephony, Mar. 1993, pp. 40, 42 and 46.
R. Steele. Towards a High-Capacity Digital Cellular Mobile Radio System. "Towards a High Capacity Digital Cellular Mobile Radio System," IEE Proceedings, vol. 132, Pt.F, No. 5, Aug. 1985, pp. 405-415.
Tang, Fiber Optic Antenna Remoting for Multi-Sector Cellular Cell Sites. GTE Laboratories—Abstract (Conference Jun. 14-18, 1992).
Titch, "Kentrox boosts coverage and capacity," Telephony Jan. 25, 1993 (1 page).
Urban Microcell System Layout. GTE Laboratories (Conference Jun. 14-18, 1992).
Wala, 1993 43rd IEEE Vehicular Technology Conference, May 18-20, 1993, Personal Communication—Freedom Through Wire-

(56) References Cited

OTHER PUBLICATIONS less Technology, Waseca Technology Inc., published May 18, 1993, "A New Microcell Freedom Architecture Using Digital Optical Transport," pp. 585-588.
"ZoneMaster.TM.—Maximum Coverage for High-Capacity Locations". Decibel Multi Media MicroCELL System. 4 pages 1993 Decibel Products. 2-83-5M.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
China Patent Offfice, "Notice of Grant of Patent Right for Invention from CN Application No. 01815499.9 mailed Oct. 24, 2008", "from Foreign Counterpart of US. Appl. No. 09/619,431", Oct. 24, 2008, pp. 1-4, Published in: CN.
Chinese Patent Office, "First Office Action from CN Application No. 01815499.9 mailed Jul. 8, 2005", "from Foreign Counterpart of U.S. Appl. No. 09/619,431", Jul. 8, 2005, pp. 1-8, Published in: CN.
Chinese Patent Office, "Second Office Action from CN Application No. 01815499.9 mailed May 11, 2007", "from Foreign Counterpart of U.S. Appl. No. 09/619,431", May 11, 2007, pp. 1-5, Published in: CN.
Chinese Patent Office, "Third Office Action from CN Application No. 01815499.9 mailed Oct. 26, 2007", "from Foreign Counterpart of U.S. Appl. No. 09/619,431", Oct. 26, 2007, pp. 1-8, Published in: CN.
Chinese Patent Office, "Fourth Office Action from CN Application No. 01815499.9 mailed Mar. 7, 2007", "from Foreign Counterpart of U.S. Appl. No. 09/619,431", Mar. 7, 2007, pp. 1-8, Published in: CN.
Chinese Patent Office, "Notification to Grant Patent Right for Invention from CN Application No. 200710153587. X mailed May 28, 2013", "from Foreign Counterpart of U.S. Appl. No. 09/619,431", May 28, 2013, pp. 1-3, Published in: CN.
Chinese Patent Office, "Second Office Action from CN Application No. 200710153587.X mailed Feb. 4, 2013", "from Foreign Counterpart of U.S. Appl. No. 09/619,431", Feb. 4, 2013, pp. 1-7, Published in: CN.
Chinese Patent Office, "First Office Action from CN Application No. 200710153587.X mailed Mar. 19, 2010", "from Foreign Counterpart of U.S. Appl. No. 09/619,431", Mar. 19, 2010, pp. 1-12, Published in: CN.
Chinese Patent Office, "Decision on Rejection from CN Application No. 200710153587.X mailed Nov. 2, 2010", "from Foreign Counterpart of U.S. Appl. No. 09/619,431", Nov. 2, 2010, pp. 1-9, Published in: CN.
Chinese Patent Office, "Notice of Reexamination from CN Application No. 200710153587.X mailed Jun. 21, 2012", "from Foreign Counterpart of U.S. Appl. No. 09/619,431", Jun. 21, 2012, pp. 1-18, Published in: CN.
Chinese Patent Office, "Second Office Action from CN Application No. 200910005002.9 mailed Jan. 23, 2013", "from Foreign Counterpart of U.S. Appl. No. 09/619,431", Jan. 23, 2013, pp. 1-11, Published in: CN.
China Patent Office, "Notification to Grant Patent Right for Invention from CN Application No. 200910005002.9 mailed Aug. 19, 2013", Aug. 19, 2013, pp. 1-6, Published in: CN.
Chinese Patent Office, "First Office Action from CN Application No. 200910005002.9 mailed Apr. 6, 2012", "from Foreign Counterpart of U.S. Appl. No. 09/619,431",Apr. 6, 2012,pp. 1-12, Publishedin: CN.
European Patent Office, "Communication under Rule 71(3) EPC from EPO Application No. 01950794.6-2411 mailed May 3, 2011", "from Foreign Counterpart of U.S. Appl. No. 09/619,431", May 3, 2011, pp. 1-45, Published in: EP.
European Patent Office, "Office Action from EPO Application No. 019507946-2411 mailed Feb. 24, 2006", "from Foreign Counterpart of U.S. Appl. No. 09/619,431", Feb. 24, 2006, pp. 1-5, Published in: EP.
European Patent Office, "Office Action from EPO Application No. 01950794.6-2411 mailed Mar. 6, 2007", "from Foreign Counterpart of U.S. Appl. No. 09/619,431", Mar. 6, 2007, pp. 1-4, Published in: EP.
European Patent Office, "Office Action from EPO Application No. 01950794.6-2411 mailed Nov. 16, 2010", "from Foreign Counterpart of U.S. Appl. No. 09/619,431", Nov. 16, 2010, pp. 1-4, Published in: EP.
European Patent Office, "Summons to Attend Oral Proceedings from EPO Application No. 01950794.6-2411 mailed May 21, 2010", "from Foreign Counterpart of U.S. Appl. No. 09/619,431", May 21, 2010, pp. 1-6, Published in: EP.
European Patent Office, "Extended European Search Report from EPO Application No. 10011450.3-2411 mailed Jan. 14, 2011", "from Foreign Counterpart of U.S. Appl. No. 09/619,431", Jan. 14, 2011, pp. 1-9, Published in: EP.
U.S. Patent Office, "Notice of Allowance", "U.S. Appl. No. 09/619,431", Aug. 12, 2003, pp. 1-9.
U.S. Patent and Trademark Office, "Office Action", "U.S. Appl. No. 09/619,431", Mar. 13, 2003, pp. 1-15.
U.S. Patent and Trademark Office, "Final Office Action", "U.S. Appl. No. 10/740,944", Apr. 25, 2007, pp. 1-19.
U.S. Patent and Trademark Office, "Final Office Action", "U.S. Appl. No. 10/740,944", Jul. 18, 2007, pp. 1-21.
U.S. Patent and Trademark Office, "Final Office Action", "U.S. Appl. No. 10/740,944", Oct. 3, 2007, pp. 1-22.
U.S. Patent and Trademark Office "Final Office Action", "U.S. Appl. No. 10/740,944", Oct. 14, 2008, pp. 1-25.
U.S. Patent and Trademark Office, "Notice of Allowance", "U.S. Appl. No. 10/740,944", Aug. 13, 2009, pp. 1-12.
U.S. Patent and Trademark Office, "Office Action", "U.S. Appl. No. 10/740,944", Aug. 24, 2006, pp. 1-19.
U.S. Patent and Trademark Office, "Final Office Action", "U.S. Appl. No. 10/740,944", Feb. 5, 2007, pp. 1-16.
U.S. Patent and Trademark Office, "Office Action", "U.S. Appl. No. 10/740,944", Apr. 3, 2008.
U.S. Patent and Trademark Office, "Office Action", "U.S. Appl. No. 10/740,944", Feb. 27, 2009, pp. 1-25.
U.S. Patent and Trademark Office, "Notice of Allowance", "U.S. Appl. No. 12/617,215", Aug. 2, 2012, pp. 1-11.
U.S. Patent and Trademark Office, "Office Action", "U.S. Appl. No. 12/617,215", Apr. 11, 2012, pp. 1-12.
U.S. Patent and Trademark Office, "Notice of Allowance and Fees Due", "from U.S. Appl. No. 13/662,948", Jul. 3, 2013, pp. 1-10, Published in: US.
U.S. Patent and Trademark Office, "Office Action", "from U.S. Appl. No. 13/662,948", Apr. 24, 2013, pp. 1-23, Published in: US.
The International Bureau of WIPO, "International Preliminary Examination Report from PCT Application No. PCT/US 01/21021 mailed Jun. 10, 2002", "from PCT Counterpart of U.S. Appl. No. 09/619,431", Jun. 10, 2002, pp. 1-3, Published in: WO.
International Searching Authority, "International Search Report from PCT Application No. PCT/US 01/21021 mailed Nov. 15, 2001", "from Foreign Counterpart of U.S. Appl. No. 09/619,431", Nov. 15, 2001, pp. 1-7, Published in: WO.
The International Bureau of WIPO, "Written Opinion from PCT Application No. PCT/US 01/21021 mailed Mar. 18, 2002", "from Foreign Counterpart of U.S. Appl. No. 09/619,431", Mar. 18, 2002, pp. 1-2, Published in: WO.
China Patent Office, "Notice of Grant of Patent Right for Invention from CN Application No. 94192782.2 mailed Sep. 29, 2000", "from Foreign Counterpart of U.S. Appl. No. 08/204,660", Sep. 29, 2000, pp. 1-4, Published in: CN.
Japan Patent Office, "Office Action from JP Application No. 6-525837 mailed Oct. 14, 2003", "from foreign counterpart of U.S. Appl. No. 08/204,660", Oct. 14, 2003, pp. 1-2, Published in: JP.

(56) References Cited

OTHER PUBLICATIONS

U.S. Patent and Trademark Office, "Final Office Action", "U.S. Appl. No. 08/204,660", Jun. 12, 1996, pp. 1-8, Published in: US.
U.S. Patent and Trademark Office, "Notice of Allowance", "U.S. Appl. No. 08/204,660", Oct. 2, 1996, pp. 1-4, Published in: US.
U.S. Patent and Trademark Office, "Office Action", "U.S. Appl. No. 08/204,660", Apr. 4, 1995, pp. 1-14, Published in: US.
U.S. Patent and Trademark Office, "Office Action", "U.S. Appl. No. 08/204,660", Oct. 26, 1995, pp. 1-8, Published in: US.
U.S. Patent and Trademark Office, "Office Action", "U.S. Appl. No. 08/299,159", Feb. 1-9, 1997, pp. 1-9, Published in: US.
U.S. Patent and Trademark Office, "Restriction Requirement", "U.S. Appl. No. 08/204,660", Mar. 10, 1995, pp. 1-13, Published in: US.
U.S. Patent and Trademark Office, "Notice of Intent to Issue a Reexam Certificate", "U.S. Appl. No. 90/010,357", Jun. 22, 2010, pp. 1-18, Published in: US.
U.S. Patent and Trademark Office, "Order Granting/Denying Request for Ex Parte Reexamination", "U.S. Appl. No. 90/010,357", Mar. 12, 2009, pp. 1-10, Published in: US.
U.S. Patent and Trademark Office, "Office Action", "U.S. Appl. No. 90/010,357", Sep. 25, 2009, pp. 1-17, Published in: US.
U.S. Patent and Trademark Office, "Office Action", "U.S. Appl. No. 08/294,742", May 27, 1996, pp. 1-5, Published in: US.
U.S. Patent and Trademark Office, "Office Action", "U.S. Appl. No. 08/294,742", Oct. 26, 1996, pp. 1-4, Published in: US.
U.S. Patent and Trademark Office, "Office Action", "U.S. Appl. No. 08/298,652", May 29, 1995, pp. 1-7, Published in: US.
U.S. Patent and Trademark Office, "Notice of Allowance", "U.S. Appl. No. 08/299,159", Aug. 19, 1997, pp. 1-9, Published in: US.
U.S. Patent and Trademark Office, "Office Action", "U.S. Appl. No. 08/299,159", Jul. 17, 1995, pp. 1-5, Published in: US.
U.S. Patent and Trademark Office, "Office Action", "U.S. Appl. No. 08/299,159", Apr. 9, 1996, pp. 1-3, Published in: US.
U.S. Patent and Trademark Office, "Office Action", "U.S. Appl. No. 08/299,159", Oct. 2, 1996, pp. 1-2, Published in: US.
U.S. Patent and Trademark Office, "Notice of Allowance", "U.S. Appl. No. 08/410,129", Oct. 17, 1996, pp. 1-6, Published in: US.
U.S. Patent and Trademark Office, "Office Action", "U.S. Appl. No. 08/410,129", Jan. 23, 1996, pp. 1-12, Published in: US.
U.S. Patent and Trademark Office, "Notice of Intent to Issue a Reexam Certificate", "U.S. Appl. No. 90/010,362", Jun. 22, 2010, pp. 1-16, Published in: US.
U.S. Patent and Trademark Office, "Order Granting/Denying Request for Ex Parte Reexamination", "U.S. Appl. No. 90/010,362", Apr. 17, 2009, pp. 1-8, Published in: US.
U.S. Patent and Trademark Office, "Office Action", "U.S. Appl. No. 90/010,362", Sep. 25, 2009, pp. 1-18, Published in: US.
U.S. Patent and Trademark Office, "Notice of Allowance", "U.S. Appl. No. 09/747,273", Aug. 8, 2007, pp. 1-8.
U.S. Patent and Trademark Office, "Office Action", "U.S. Appl. No. 09/747,273", Mar. 30, 2004, pp. 1-19.
U.S. Patent and Trademark Office, "Office Action", "U.S. Appl. No. 09/747,273", Oct. 6, 2005, pp. 1-10.
U.S. Patent and Trademark Office, "Final Office Action", "U.S. Appl. No. 90/010,363", Jun. 23, 2010, pp. 1-21, Published in: US.
U.S. Patent and Trademark Office, "Notice of Intent to Issue a Reexam Certificate", "U.S. Appl. No. 90/010,363", Dec. 6, 2010, pp. 1-21, Published in: US.
U.S. Patent and Trademark Office, "Order Granting/Denying Request for Ex Parte Reexamination", "U.S. Appl. No. 09/010,363", Apr. 17, 2009, pp. 1-10, Published in: US.
U.S. Patent and Trademark Office, "Office Action", "U.S. Appl. No. 90/010,363", Sep. 25, 2009, pp. 1-32, Published in: US.
U.S. Patent and Trademark Office, "Advisory Action", "U.S. Appl. No. 11/937,255", Nov. 3, 2011, pp. 1-2.
U.S. Patent and Trademark Office, "Final Office Action", "U.S. Appl. No. 11/937,255", Aug. 29, 2011, pp. 1-14.
U.S. Patent and Trademark Office, "Notice of Allowance", "U.S. Appl. No. 11/937,255", Sep. 17, 2012, pp. 1-11.
U.S. Patent and Trademark Office, "Office Action", "U.S. Appl. No. 11/937,255", Feb. 17, 2011, pp. 1-13.
U.S. Patent and Trademark Office, "Office Action", "U.S. Appl. No. 13/725,866", Jan. 22, 2014, pp. 1-28, Published in: US.
U.S. Patent and Trademark Office, "Restriction Requirement", "U.S. Appl. No. 13/725,866", Sep. 10, 2013, pp. 1-8, Published in: US.
The International Bureau of WIPO, "International Preliminary Report on Patentability from PCT Application No. PCT/US94/05897 mailed May 29, 1995", May 29, 1995, pp. 1-8, Publisher: from PCT Counterpart of U.S. Appl. No. 08/204,660, Published in: WO.
The International Bureau of WIPO, "International Search Report from PCT Application No. PCT/US94/05897 mailed Oct. 31, 1994", "from PCT Counterpart of U.S. Appl. No. 08/204,660", Oct. 31, 1994, pp. 1-7, Published in: WO.
The International Bureau of WIPO, "Written Opinion from PCT Application No. PCT/US 94/05897 mailed Feb. 14, 1995", "from PCT Counterpart to U.S. Appl. No. 08/204,660", Feb. 14, 1995, pp. 1-7, Published in: WO.
China Patent Office, "Notification of Grant Patent Right for Invention from CN Application No. 200380109396.3 mailed Jun. 29, 2010", "from Chinese Counterpart of U.S. Appl. No. 10/395,743", Jun. 29, 2010, pp. 1-4, Published in: CN.
China Patent Office, "First Office Action from CN Application No. 200380109396.3 mailed Jan. 4, 2008", "from Chinese Counterpart of U.S. Appl. No. 10/395,743", Jan. 4, 2008, pp. 1-7, Published in: CN.
European Patent Office, "Office Action from EPO Application No. 03790242.6-2415 mailed Jul. 24, 2007", "from European Counterpart of U.S. Appl. No. 10/395,743", Jul. 24, 2007, pp. 1-4, Published in: EP.
European Patent Office, "Office Action from EPO Application No. 03790242.6-2415 mailed Feb. 11, 2009", "from European Counterpart of U.S. Appl. No. 10/395,743", Feb. 11, 2009, pp. 1-4, Published in: EP.
Korean Patent Office, "Decision to Grant from KR Application No. 2005-7010190 mailed Feb. 2, 2012", "from Foreign Counterpart to U.S. Appl. No. 10/395,743", Feb. 2, 2012, pp. 1-7, Published in: KR.
Korean Patent Office, "Office Action from KR Application No. 2005-7010190 mailed Sep. 30, 2010", "from Foreign Counterpart to U.S. Appl. No. 10/395,743", Sep. 30, 2010, pp. 1-5, Published in: KR.
Korean Patent Office, "Final Rejection from KR Application No. 2005-7010190 mailed Oct. 31, 2011", "from Korean Counterpart to U.S. Appl. No. 10/395,743", Oct. 31, 2011, pp. 1-3, Published in: KR.
The International Bureau of WIPO, "International Preliminary Report on Patentability from PCT Application No. PCT/US03/38302 mailed Dec. 14, 2011", "from PCT Counterpart of U.S. Appl. No. 10/395,743", Dec. 14, 2011, pp. 1-10, Published in: WO.
The International Bureau of WIPO, "International Search Report from PCT Application No. PCT/US03/38302 mailed May 2, 2005", "from PCT Counterpart of U.S. Appl. No. 10/395,743", May 2, 2005, pp. 1-5, Published in: WO.
Foxcom Wireless Proprietary Information, "Application Note RFIBER-RF Fiberoptic Links for Wireless Applications", 1998, pp. 3-11 .
City Cell, Cellular Industry the Day Group, "ADC Kentrox Citycell Field Trial Yields Another First—Simultaneous Analog and Digital Calls", prior to Dec. 22, 2000, p. 1.
Ericksson, "Advertisement by Ericksson", "Telephony", 1994, p. 1.
"ADC Kentrox Introduces Citycell 824, A Replacement for Conventional Cell Sites; Company's Original Goal Was to Improve F", "Telocator Bulletin", Feb. 1993, p. 1.
Foxcom Wireless Preperietary Information, "Litenna In-Building RF Distribution System", 1998, pp. 1-8.
Horowitz, Paul, "Digital Electronics", "The Art of Electronics", 1980, p. 316, Publisher: Press Syndicte of the University of Cambridge.
Schneiderman, "Offshore Markets Gain in Size, Competitiveness Even the Smallest Industry Companies Are Expanding Their Global

(56) References Cited

OTHER PUBLICATIONS

Buisness", "Microwaves and RF", Mar. 1993, pp. 33-39, vol. 32, No. 3, Publisher: Penton Publishing, Inc, Published in: Berea, OH.
Nakatsugawa et al., "Software Radio Base and Personal Stations for Cellular/PCS Systems", 2000, pp. 617-621, Publisher: IEEE.
European Patent Office, "Communication Under Rule 71(3) EPC from EPO Application No. 03790242.6-2415 mailed May 14, 2013", "from European Counterpart of U.S. Appl. No. 10/395,743", May 15, 2013, pp. 1-27, Published in: EP.

* cited by examiner

DISTRIBUTED DIGITAL ANTENNA SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

[This application] *Notice: More than one reissue application has been filed for the reissue of U.S. Pat. No. 8,958,789. The reissue applications are reissue application Ser. No. 15/436,605 filed on Feb. 17, 2017; and this continuation reissue application Ser. No. (the present continuation reissue application). All reissue applications are reissues of the same issued U.S. Pat. No. 8,958,789 (application Ser. No. 10/395,743 filed Mar. 24, 2003), which* claims priority to U.S. Provisional Patent Application Ser. No. 60/430,434 filed Dec. 3, 2002, and titled "Distributed Digital Antenna System," which is commonly assigned and incorporated by reference herein.

TECHNICAL FIELD

The present invention relates generally to communications and particularly to communications through a distributed antenna system.

BACKGROUND

Various types of wireless communication systems have become prevalent around the world. For example, cellular communication systems cover most major metropolitan areas as well as major highways through remote areas. Cellular systems permit individuals with cellular handsets to communicate with base stations that are connected to the public switched telephone network (PSTN) or some other communication network.

As with any communication system, cellular systems can leave coverage "holes" where the signal from the base stations cannot reach. The holes can be in tunnels, valleys, city streets between tall buildings, or any other location where a radio frequency (RF) signal is blocked.

Placing additional base stations where these coverage holes are located is not always an option. Base stations tend to be very expensive due not only to the cost of the equipment but also because of land acquisition costs. Additionally, large base station antennas may not fit within an area either physically or aesthetically.

One solution to hole coverage is to use smaller remote antennas where coverage is needed but a base station is not warranted or desired. One problem with remote antennas, however, is that coaxial cable cannot be run long distances due to attenuation. Remote antennas are difficult to install along a highway or through a tunnel due to this attenuation problem. Using repeaters may not be an option since this only adds to the expense and complexity of the system. There is a resulting need in the art for a distributed antenna system that does not suffer from attenuation problems.

SUMMARY OF THE INVENTION

The embodiments of the present invention encompass a distributed digital antenna system that has a host unit for converting radio frequency signals to digital optical signals and digital optical signals to radio frequency signals. The digital optical signals are transmitted over an optical medium to a plurality of remote units that are daisy-chained along the optical medium. Each remote unit transmits an analog representation of the digital optical signals from the host unit and receives radio frequency signals that are converted by the remote unit to digital optical signals for use by the host unit.

DETAILED DESCRIPTION OF THE PREFERRED EMBODIMENT

The embodiments of the present invention provide a digital distributed antenna system that enables a communication system to fill coverage holes without the expense of additional base stations. This is accomplished by distributing a fiber optic cable through the area in which coverage is desired and tapping into the fiber at desired antenna locations.

The embodiments of the present invention refer to fiber optics as a means of communication between remote units and the host unit. However, any optical medium, such as a laser through the air, can be substituted for the optical fiber.

Figure 1:
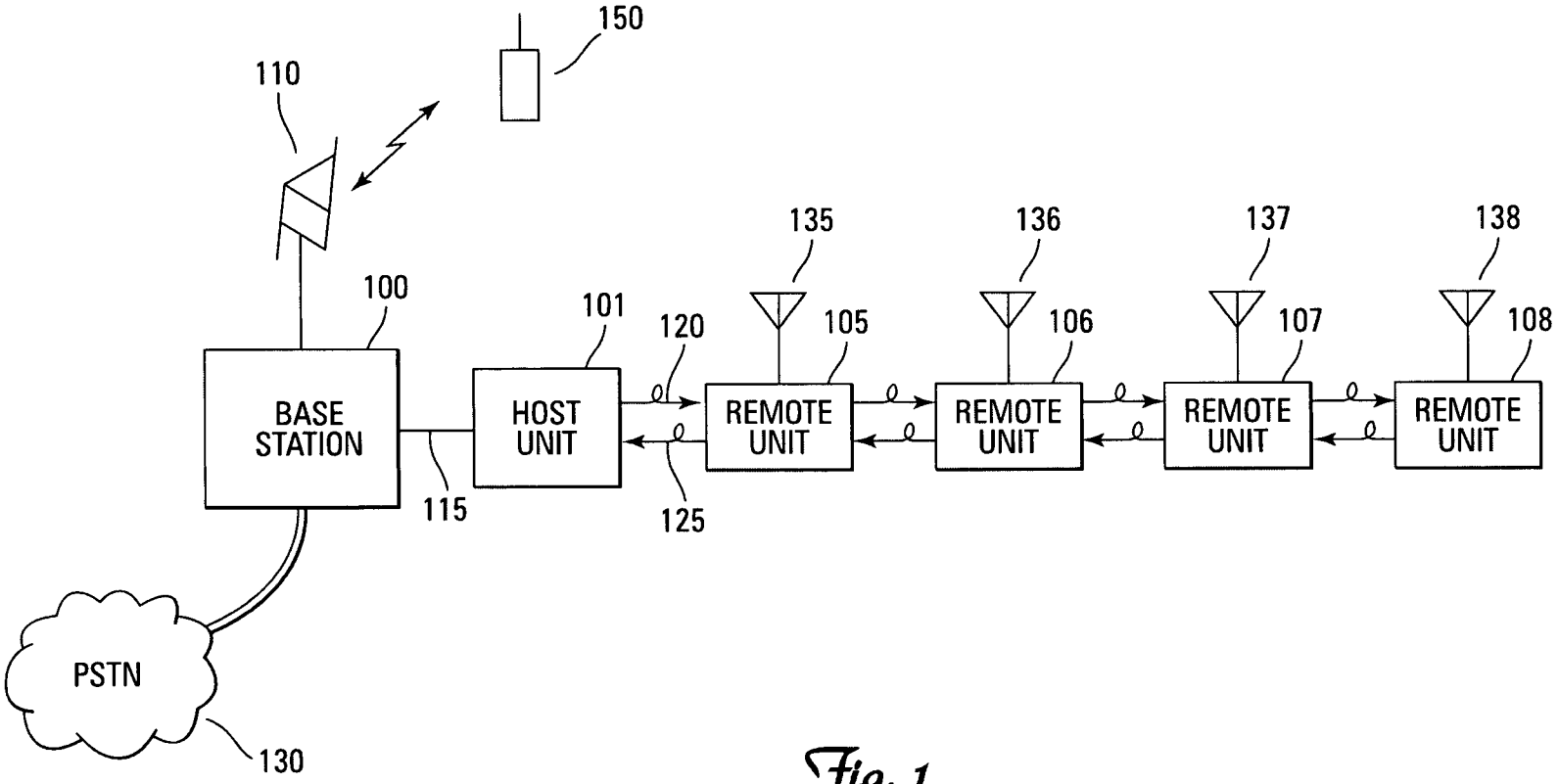
FIG. 1 shows a block diagram of one embodiment of a distributed digital antenna system of the present invention.

FIG. 1 illustrates a block diagram of one embodiment of a distributed digital antenna system of the present invention. The system has a base station (100) that communicates over an RF link using an antenna (110). The base station communicates over the RF link using any appropriate air interface standard. For example, the air interface standard comprises one of Advanced Mobile Phone System (AMPS), code division multiple access (CDMA), time division multiple access (TDMA), or Global System for Mobile communications (GSM) or any other appropriate air interface standard.

The RF link is made up of a forward link over which the base station (100) transmits to a subscriber unit wireless terminal (150). The subscriber unit (150) transmits back to the base station (100) over a reverse link. The subscriber unit (150) is either a mobile station or a fixed station such as in a wireless local loop system.

The base station (100) has the transmitters and receivers that enable the subscriber unit (150) to communicate with the public switched telephone network (PSTN) (130). In one embodiment, the base station also links the subscriber unit (150) to other subscriber units that are communicating with other base stations. In one embodiment, the base station (100) is connected to the PSTN through a mobile switching center that handles the switching of calls with multiple base stations.

A host unit (101) is connected to the base station (100) through an RF link (115). In one embodiment, this link (115) is a coaxial cable. Other embodiments use other types of connections such as an air interface or an optical fiber carrying digital RF signals. U.S. patent application Ser. No.

09/619,431, assigned to ADC Telecommunications, Inc. and incorporated herein by reference, discusses digital RF signals.

The host unit (101) is responsible for converting the RF signal from the base station (100) to an optical signal for transmission over an optical medium. The host unit (101) also converts a received optical signal to an RF signal for transmission to the base station (100). In other embodiments, the host unit (101) performs additional functions.

One or more remote units (105-108) are connected to the host unit (101) through an optical medium, such as fiber optic lines (120 and 125), in a daisy-chain arrangement. The remote units (105-108) are placed in locations that require additional signal coverage due to a lack of coverage by the base station (100). The remote units (105-108) communicate with subscriber units in a particular remote unit's coverage area over an RF link provided by the remote unit antennas (135-138).

For purposes of illustration, four remote units (105-108) are shown. However, alternate embodiments use other quantities of remote units. If only a small geographic area requires coverage, as few as one remote unit (105) is used. If a highway in a remote area requires additional coverage, more than four remote units are typically used.

The embodiment of FIG. 1 uses a separate fiber optic line for each direction of communication. Each fiber carries a different wavelength. For example, the fiber optic line (120) from the host unit (101) to the remote units (105-108) carries a wavelength of $\lambda_1$. The fiber optic line (125) from the remote units (105-108) to the host unit (101) carries a wavelength of $\lambda_2$. In alternate embodiments, each fiber carries the same wavelength.

The fiber optic line (120) from the host unit (101) to the remote units (105-108) carries the digital optical signal for transmission by the (105-108). The fiber optic line (125) from the remote units (105-108) carries a digital optical signal comprising the sum of the received signals from each of the remote units (105-108). The generation of this summation signal from the remote units is discussed subsequently.

Figure 2:
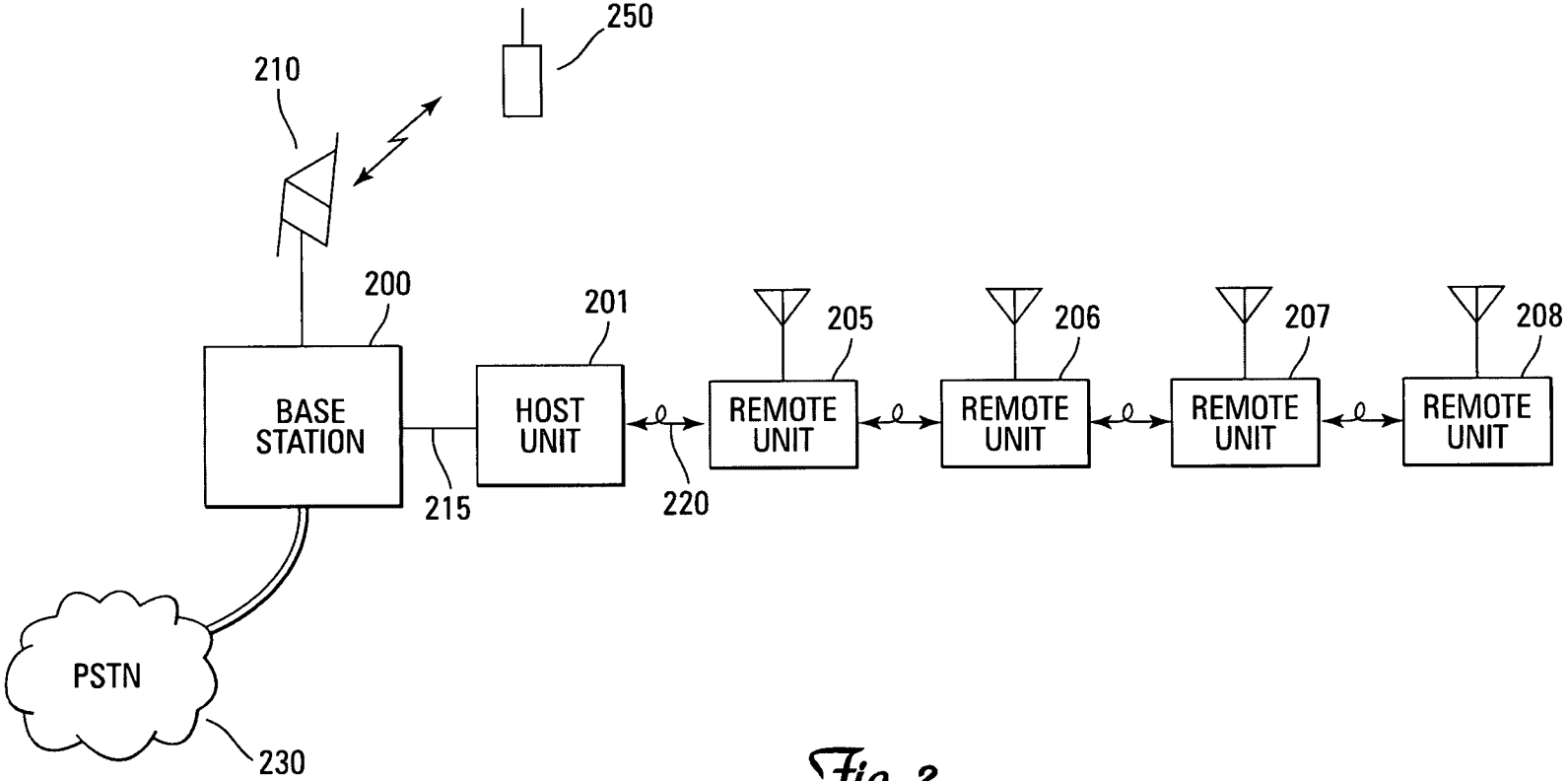
FIG. 2 shows a block diagram of another embodiment of a distributed digital antenna system of the present invention.

FIG. 2 illustrates a block diagram of another embodiment of a distributed digital antenna system of the present invention. This system is similar to the embodiment of FIG. 1 except that the remote units (205-208) are connected to the host unit (201) over a single optical medium (220).

The system of FIG. 2 has a base station (200) that communicates over an RF link using an antenna (210). The base station can communicate over the RF link using any air interface standard. For example, the air interface standard may be code division multiple access (CDMA), time division multiple access (TDMA), or Global System for Mobile communications (GSM).

The RF link is made up of a forward link over which the base station (200) transmits to a subscriber unit (250). The subscriber unit (250) transmits back to the base station (200) over a reverse link. The subscriber unit (250) may be a mobile station or a fixed station such as in a wireless local loop system.

The base station (200) has the transmitters and receivers that enable the subscriber unit (250) to communicate with the public switched telephone network (PSTN) (230). The base station may also link the subscriber unit (250) to other subscriber units that are communicating with other base stations. In one embodiment, the base station (200) is connected to the PSTN through a mobile switching center that handles the switching of calls with multiple base stations.

A host unit (201) is connected to the base station (200) through an RF link (215). In one embodiment, this link (215) is a coaxial cable. Other embodiments use other types of connections such as an air interface or an optical fiber carrying digital RF signals.

The host unit (201) is responsible for converting the RF signal from the base station (200) to a digital optical signal for transmission over an optical medium. The host unit (201) also converts a received optical signal to an RF signal for transmission to the base station (200). In other embodiments, the host unit (201) performs additional functions.

One or more remote units (205-208) are connected to the host unit (201) through an optical medium, such as a fiber optic line (220), that is connected in a daisy-chain arrangement. The remote units (205-208) are placed in locations that require additional signal coverage due to a lack of coverage by the base station (200).

For purposes of illustration, four remote units (205-208) are shown. However, alternate embodiments use other quantities of remote units.

The embodiment of FIG. 2 uses a single fiber optic line (220) for communication both to and from the remote units (205-208). This is accomplished by the single fiber (220) carrying multiple wavelengths. For example, the fiber optic line (220) uses a wavelength of $\lambda_1$ for the digital signal from the host unit to the remote units (205-208). The fiber optic line (220) also carries a digital summation signal with a wavelength of $\lambda_2$. This digital summation signal is the sum of the received signals from the remote units (205-208). The generation of this summation signal from the remote units is discussed subsequently.

Figure 3:
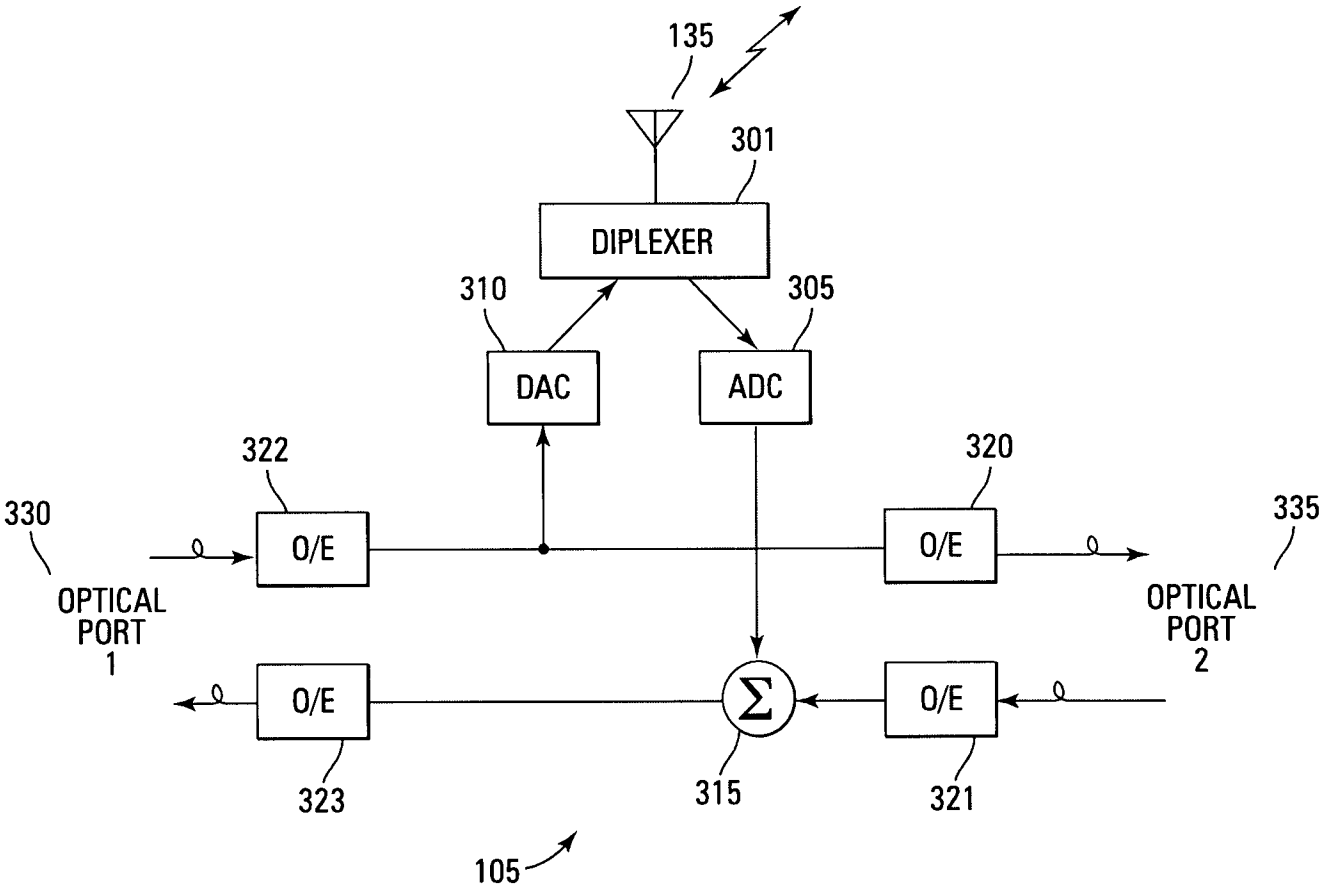
FIG. 3 shows a block diagram of one embodiment of a remote unit in accordance with the system of FIG. 1.

FIG. 3 illustrates a block diagram of one embodiment of a remote unit (105) of FIG. 1. Each of the remote units (105-108) of the embodiment of FIG. 1 are substantially identical in functional composition.

The remote unit (105) transmits and receives RF signals over the antenna (135). Both the receive and transmit circuitry is connected to the antenna (135) through a diplexer (301).

Alternate embodiments use other quantities of antennas. For example, one embodiment uses three antennas to cover three different sectors of an area.

An analog signal that is received on the antenna (135) is split off by the diplexer (301) to an analog-to-digital converter (305). The analog-to-digital converter (305) digitizes the received analog signal by periodically sampling the signal. The sampling generates a digital representation of the received analog signal.

The digitized received signal is input to a summer (315) to be added to the digitized signals from the preceding remote units in the daisy-chain. The input of the summer (315), therefore, is coupled to an output of a previous remote unit. The output of the summer (315) is a summation signal that is coupled to either the input of a subsequent remote unit or to the host unit. The host unit thus receives a summation signal that represents the sum of all the signals received by the remote units (105-108) of the system.

A digital signal from the host unit is coupled to a digital-to-analog converter (310). The digital-to-analog converter (310) takes the digital representation of an analog signal and converts it to the analog signal for transmission by the antenna (135).

Optical-to-Electrical converters (320-323) are located at the optical ports (330 and 335) of the remote unit (105). Each optical port (330 and 335) has an input and an output that are each coupled to an Optical-to-Electrical converter (320-323).

Since the remote unit (105) operates with electrical signals that are represented by the optical signals coming in through the optical ports (330 and 335), the Optical-to-Electrical converters (320-323) are responsible for converting the optical signals to electrical signals for processing by the remote unit (105). The Optical-to-Electrical converters (320-323) are also responsible for converting received electrical signals from electrical to an optical representation for transmission over the optical fiber.

Figure 4:
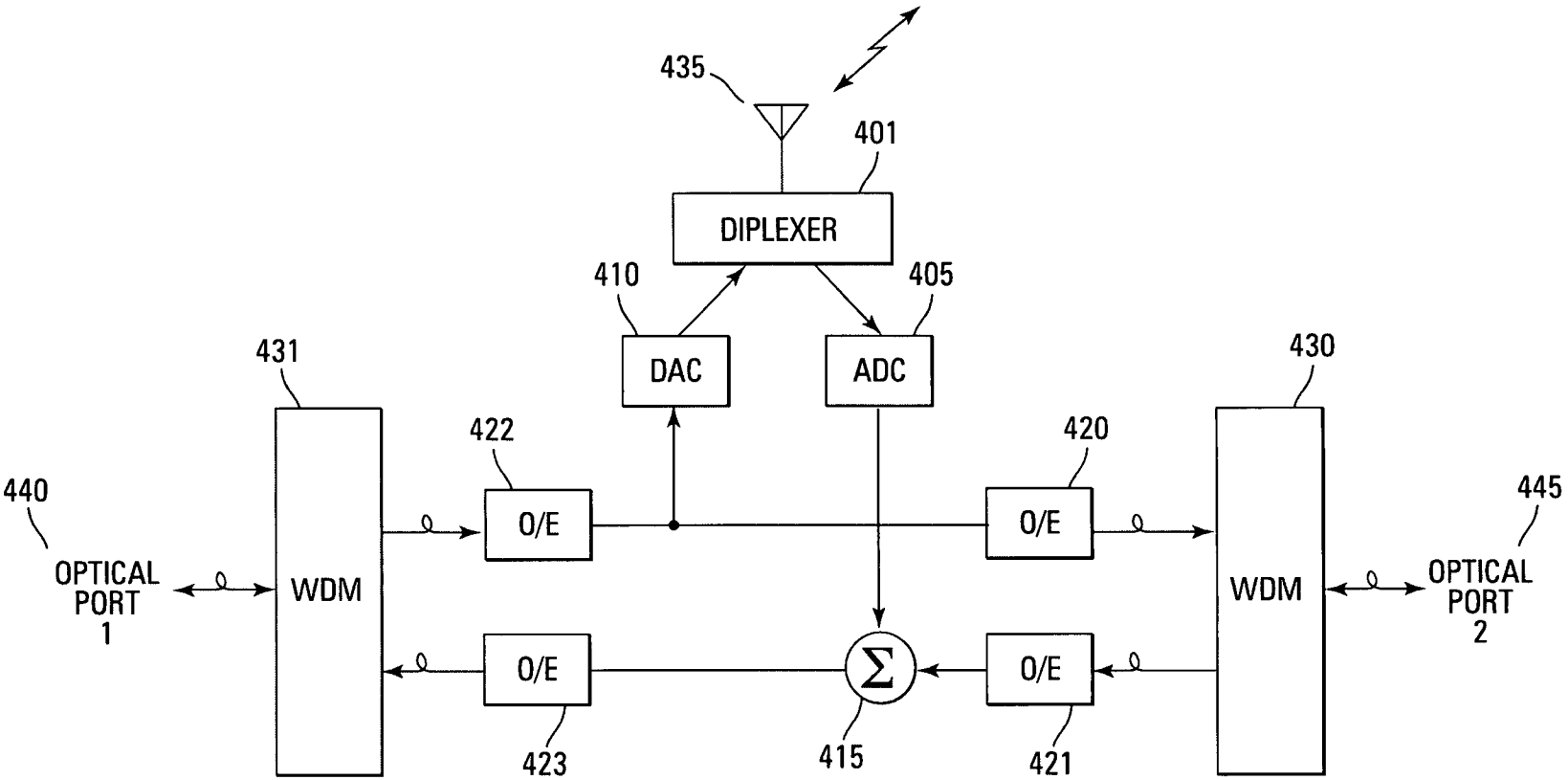
FIG. 4 shows a block diagram of one embodiment of a remote unit in accordance with the system of FIG. 2.

FIG. 4 illustrates a block diagram of one embodiment of a remote unit (205) of FIG. 2. Each of the remote units (205-208) of the embodiment of FIG. 1 is substantially identical in functional composition.

The remote unit (205) transmits and receives RF signals over the antenna (435). Both the receive and transmit circuitry are connected to the antenna (435) through a diplexer (401).

Alternate embodiments use other quantities of antennas. For example, one embodiment uses three antennas to cover three sectors of an area.

An analog signal that is received on the antenna (435) is split off by the diplexer (401) to an analog-to-digital converter (405). The analog-to-digital converter (405) digitizes the received analog signal by periodically sampling the signal. The sampling generates a digital representation of the received analog signal.

The digitized received signal is input to a summer (415) to be added to the digitized signals from the preceding remote units in the daisy-chain. The host unit thus receives a summation signal that represents the sum of all the signals received by the remote units (205-208) of the system.

A digital signal from the host unit is coupled to a digital-to-analog converter (410). The digital-to-analog converter (410) takes the digital representation of an analog signal and converts it to the analog signal for transmission by the antenna (435).

Optical-to-Electrical converters (420-423) are located at the optical ports (440 and 445) of the remote unit (205). Each optical port (440 and 445) has an input and an output that are each coupled to an Optical-to-Electrical converter (420-423).

Since the remote unit (205) operates with electrical signals that are represented by the optical signals coming in through the optical ports (440 and 445), the Optical-to-Electrical converters (420-423) are responsible for converting the optical signals to electrical signals for processing by the remote unit (205). The Optical-to-Electrical converters (420-423) are also responsible for converting received electrical signals from electrical to an optical representation for transmission over the optical fiber.

A wavelength division multiplexer (WDM) (430 and 431) is located at each optical port (440 and 445). The WDMs (430 and 431) perform the optical processing necessary to combine several optical signals having several wavelengths. The WDMs (430 and 431) also perform the optical demultiplexing necessary to split the multiple wavelengths of a single fiber to their own signal paths.

In summary, the distributed digital antenna system provides multiple daisy-chained antennas on a single medium such as optical fiber. The fiber can be tapped anywhere along its length multiple times to provide economical radio coverage in areas where a base station would be cost prohibitive.

Numerous modifications and variations of the present invention are possible in light of the above teachings. It is therefore to be understood that within the scope of the appended claims, the invention may be practiced otherwise than as specifically described herein.

What is claimed is:

[1. A distributed digital antenna system comprising:

a host unit that converts a first signal to a transmitted digital optical signal and that converts a received digital optical signal to a second signal;

an optical medium coupled to the host unit to carry the transmitted and received digital optical signals; and a plurality of remote units daisy-chained along the optical medium such that each remote unit transmits an analog representation of the transmitted digital optical signal and receives radio frequency signals that are converted by the remote unit to a digitized received spectrum, each of the remote units including a summer that sums the digitized received spectrum with a corresponding digitized received spectrum from any preceding remote unit of the daisy-chained remote units to generate the received digital optical signal for transmission to the host unit.]

[2. The system of claim 1 wherein the first and second signals are transported over an optical, electrical or wireless medium.]

[3. The system of claim 1 wherein the optical medium is an optical fiber.]

[4. The system of claim 1 and further including a base station, coupled to the host unit, that communicates with subscriber units over a radio frequency air interface.]

[5. The system of claim 4 wherein the base station transmits the first signal and receives the second signal.]

[6. The system of claim 4 wherein the base station communicates signals from the host unit to a public switched telephone network.]

[7. A distributed digital antenna system that communicates signals with a base station that is coupled to a data network, the system comprising:

a host unit that converts radio frequency signals from the base station to digital optical signals and that converts digital optical signals from the digital antenna system to radio frequency signals for use by the base station;

an optical medium coupled to the host unit that carries the digital optical signals; and a plurality of remote units daisy-chained along the optical medium such that each remote unit transmits radio frequency signals over an air interface as an analog representation of the digital optical signals from the base station and receives radio frequency signals over the air interface that are converted by a receiving remote unit to a digitized received spectrum, each of the remote units and the receiving remote unit including a summer that sums the digitized received spectrum with a corresponding digitized received spectrum from any preceding remote unit of the daisy-chained remote units to generate the received digital optical signals for use by the host unit.]

[8. The system of claim 7 wherein the radio frequency signals between the base station and the host unit are carried over an optical link.]

[9. The system of claim 7 wherein the optical medium is an optical fiber that carries multiple wavelengths.]

[10. The system of claim 7 wherein the optical medium is a first optical fiber that carries a first wavelength from the host unit to the plurality of remote units and a second optical fiber that carries a second wavelength from the plurality of remote units to the host unit.]

[11. The system of claim 10 wherein the second wavelength carries a digital signal that represents a summation of signals received by each of the plurality of remote units.]

[12. The system of claim 7 wherein the plurality of remote units each comprise:

an antenna that communicates the radio frequency signals over the air interface;

a plurality of optical-to-electrical converters that convert forward link digital optical signals input to the remote unit to forward link digital electrical signals and that convert reverse link electrical signals in the digitized received spectrum to reverse link digital optical signals for output to the host unit;

a digital to analog converter that converts the forward link digital electrical signals to the analog representation;

an analog-to-digital converter that converts the received radio frequency signals to the reverse link electrical signals in the digitized received spectrum; and wherein the summer sums the reverse link electrical signals in the digitized received spectrum with corresponding reverse link electrical signals in the digitized received spectrum from the preceding remote units of the optical medium daisy-chain to generate the received digital optical signals.]

[13. A remote unit in a distributed digital antenna system that communicates signals with a base station, the remote unit comprising:

an antenna that communicates radio frequency signals using an air interface standard;

a plurality of optical-to-electrical converters that convert input digital optical signals, from a host unit coupled to the base station and a daisy-chain of previous remote units, to forward link digital electrical signals;

a digital to analog converter that converts the forward link digital electrical signals to analog signals for transmission by the antenna as radio frequency signals;

an analog-to-digital converter that converts radio frequency signals from the antenna to a digitized spectrum of reverse link electrical signals; and a summer that sums the reverse link electrical signals in the digitized spectrum from the analog-to-digital converter to corresponding reverse link electrical signals from the daisy-chain of previous remote units to generate an output digital optical signal.]

[14. The remote unit of claim 13 and further including:

a first optical port that is coupled to either the host unit or a subsequent remote unit of the daisy-chain of remote units; and a second optical port that is coupled to the daisy-chain of previous remote units.]

[15. The remote unit of claim 13 wherein a first optical-to-electrical converter of the plurality of optical-to-electrical converters converts an optical summation signal from the daisy-chain of previous remote units to the output digital optical signal and a second optical-to-electrical converter converts an optical transmit signal from the host unit to the forward link digital electrical signal for conversion to an analog signal by the digital to analog converter.]

[16. A remote unit in a distributed digital antenna system that communicates signals with a base station, the remote unit comprising:

an antenna that communicates radio frequency signals using an air interface standard;

a plurality of optical-to-electrical converters that convert digital optical signals, from a host unit coupled to the base station and a daisy-chain of previous remote units, to forward link digital electrical signals, the plurality of optical-to-electrical converters further convert reverse link digital electrical signals to digital optical signals, each digital optical signal comprising a wavelength;

a digital to analog converter that converts the forward link digital electrical signals to analog signals for transmission by the antenna as radio frequency signals;

an analog-to-digital converter that converts radio frequency signals from the antenna to a digitized spectrum of reverse link electrical signals;

a summer that sums the reverse link electrical signals in the digitized spectrum from the analog-to-digital converter to an output digital optical signal from the daisy-chain of previous remote units; and a wavelength division multiplexer that demultiplexes an input digital optical signal, comprising a plurality of wavelengths, to the digital optical signals each having a wavelength in the plurality of wavelengths, the wavelength division multiplexer further multiplexes digital optical signals to the output digital optical signal comprising the plurality of wavelengths.]

[17. A method for communicating over a distributed digital antenna system, the method comprising:

converting a first radio frequency signal from a base station to a digital optical signal;

transmitting the digital optical signal over an optical medium to a plurality of remote units in a daisy-chain configuration along the optical medium;

converting the digital optical signal to a forward link digital electrical signal at each remote unit;

converting the forward link digital electrical signal to an analog signal for transmission by at least one of the remote units as a second radio frequency signal;

receiving a third radio frequency signal over an air interface of at least one of the remote units;

converting the third radio frequency signal to a received electrical signal within a digitized spectrum; and summing the digitized spectrum of the received electrical signal with a corresponding digitized spectrum of received electrical signals from previous remote units in the daisy-chain configuration.]

[18. The method of claim 17 and further including:

converting a result of the summing of the digitized spectrum of the received electrical signals to a digital optical signal;

transmitting the digital optical signal over the optical medium; and converting the digital optical signal to a fourth radio frequency signal for use by the base station.]

[19. The method of claim 17 and further including demultiplexing the digital optical signal into a plurality of optical signals each having one wavelength.]

[20. The method of claim 18 and further including the base station transmitting information in the fourth radio frequency signal to a public switched telephone network.]

[21. The method of claim 18 and further including multiplexing single wavelength optical signals from the remote unit into a single optical signal comprising a plurality of wavelengths.]

[22. A method for a remote terminal to communicate with a wireless terminal in a geographic area, the method comprising:

converting an optical signal to a forward link electrical signal;

converting the forward link electrical signal to a forward link analog signal;

transmitting the forward link analog signal to the wireless terminal;

receiving a reverse link analog signal from the wireless terminal;

converting the reverse link analog signal to a reverse link electrical signal;

summing a digitized spectrum of the reverse link electrical signal with a corresponding digitized spectrum of other reverse link electrical signals from other remote terminals that are daisy-chained together over an optical link; and converting the summed digitized spectrum of reverse link electrical signals to a reverse link summed optical signal for transmission to a host unit.]

[23. The system of claim 1, wherein the host unit receives a total digitized received spectrum representing the sum of all digitized received spectrum from the plurality of remote units.]

[24. The method of claim 22, wherein the summed digitized spectrum of reverse link electrical signals represents a sum of the digitized spectrum of the reverse link electrical signals of all the remote terminals that are daisy-chained together over the optical link.]

*25. A distributed antenna system comprising:*

*a host unit communicatively coupled to a base station, the base station configured to communicate with subscriber units using an air interface standard;*

*a plurality of remote units communicatively coupled to the host unit using a daisy chain;*

*wherein the host unit is configured to receive a first analog base station radio frequency signal from the base station for communicating with said subscriber units, generate a first digital signal derived from the first analog base station radio frequency signal, and communicate the first digital signal over the daisy chain to the remote units;*

*wherein the host unit is further configured to receive a second digital signal from the daisy chain, generate a second analog base station radio frequency signal comprising transmissions from said subscriber units communicating with said base station, and communicate the second analog base station radio frequency signal to the base station;*

*wherein each of the remote units is configured to receive the first digital signal from the daisy chain, generate a respective first analog wireless radio frequency signal for communicating with said subscriber units that is derived from the first digital signal, and wirelessly transmit the respective first analog wireless radio frequency signal;*

*wherein each of the remote units is configured to receive a respective second analog wireless radio frequency signal, generate a respective digitized radio frequency version of the transmissions from said subscriber units communicating with said base station, generate a respective second digital signal derived from the respective digitized radio frequency version generated at that remote unit, and communicate the respective second digital signal over the daisy chain in a direction towards the host unit;*

*wherein each of the remote units is configured to receive any respective second digital signal communicated over the daisy chain by any preceding remote unit along the daisy chain, said any respective second digital signal communicated over the daisy chain by any preceding remote unit along the daisy chain comprising a respective corresponding digitized radio frequency version of the transmissions from said subscriber units communicating with said base station; and*

*wherein each of the remote units comprises a respective summer to sum the respective digitized radio frequency version of all of the transmissions from said subscriber units communicating with said base station generated at that remote unit and the respective corresponding digitized radio frequency version of all of the transmissions from said subscriber units communicating with said base station received by that remote unit from any preceding remote unit along the daisy chain in connection with generating the respective second digital signal communicated from that remote unit over the daisy chain in the direction towards the host unit.*

*26. The distributed antenna system of claim 25, wherein the daisy chain comprises a plurality of communication lines in a daisy-chain arrangement.*

*27. The distributed antenna system of claim 26, wherein the plurality of communication lines comprise optical lines.*

*28. The distributed antenna system of claim 26, wherein the plurality of communication lines comprise an optical fiber that carries multiple wavelengths through the optical fiber.*

*29. The distributed antenna system of claim 28, wherein the daisy chain comprises a plurality of wavelength division multiplexers for multiplexing and demultiplexing the multiple wavelengths through the optical fiber.*

*30. The distributed antenna system of claim 28, wherein a first wavelength of the multiple wavelengths is used for the first digital signal; and*

*wherein a second wavelength of the multiple wavelengths is used for the second digital signal.*

*31. The distributed antenna system of claim 26, wherein the plurality of communication lines comprise an optical fiber that carries a single wavelength through the optical fiber.*

*32. The distributed antenna system of claim 25, wherein the air interface standard comprises one of a code division multiple access (CDMA) air interface standard and a time division multiple access (TDMA) air interface standard.*

*33. The distributed antenna system of claim 32, wherein the transmissions from said subscriber units communicating with said base station comprises one of CDMA transmissions and TDMA transmissions.*

*34. A method for a distributed antenna system that comprises a host unit communicatively coupled to a base station, the base station configured to communicate with subscriber units using an air interface standard, the distributed antenna system further comprising a plurality of remote units communicatively coupled to the host unit using a daisy chain, the method comprising:*

*receiving, by the host unit, a first analog base station radio frequency signal from the base station for communicating with said subscriber units;*

*generating, by the host unit, a first digital signal derived from the first analog base station radio frequency signal;*

*communicating, by the host unit, the first digital signal over the daisy chain to the remote units;*

*receiving, by the host unit, a second digital signal from the daisy chain;*

*generating, by the host unit, a second analog base station radio frequency signal comprising transmissions from said subscriber units communicating with said base station;*

*communicating, by the host unit, the second analog base station radio frequency signal to the base station;*

*receiving, by each of the remote units, the first digital signal from the daisy chain;*

*generating, by each of the remote units, a respective first analog wireless radio frequency signal for communicating with said subscriber units that is derived from the first digital signal;*

*wirelessly transmitting, by each of the remote units, the respective first analog wireless radio frequency signal;*

*receiving, by each of the remote units, a respective second analog wireless radio freguency signal;*

*generating, by each of the remote units, a respective digitized radio frequency version of the transmissions from said subscriber units communicating with said base station;*

*generating, by each of the remote units, a respective second digital signal derived from the respective digitized radio frequency version generated at that remote unit;*

*communicating, by each of the remote units, the respective second digital signal over the daisy chain in a direction towards the host unit; and*

*receiving, by each of the remote units, any respective second digital signal communicated over the daisy chain by any preceding remote unit along the daisy chain, said any respective second digital signal communicated over the daisy chain by any preceding remote unit along the daisy chain comprising a respective corresponding digitized radio frequency version of the transmissions from said subscriber units communicating with said base station; and*

*wherein generating, by each of the remote units, the respective second digital signal derived from the respective digitized radio frequency version generated at that remote unit comprises summing, by that remote unit, the respective digitized radio frequency version of all of the transmissions from said subscriber units communicating with said base station generated at that remote unit and the respective corresponding digitized radio frequency version of all of the transmissions from said subscriber units communicating with said base station received by that remote unit from any preceding remote unit along the daisy chain.*

*35. The method of claim 34, wherein the daisy chain comprises a plurality of communication lines in a daisy-chain arrangement.*

*36. The method of claim 35, wherein the plurality of communication lines comprise optical lines.*

*37. The method of claim 35, wherein the plurality of communication lines comprise an optical fiber that carries multiple wavelengths through the optical fiber.*

*38. The method of claim 37, wherein the daisy chain comprises a plurality of wavelength division multiplexers for multiplexing and demultiplexing the multiple wavelengths through the optical fiber.*

*39. The method of claim 37, wherein a first wavelength of the multiple wavelengths is used for the first digital signal; and*

*wherein a second wavelength of the multiple wavelengths is used for the second digital signal.*

*40. The method of claim 35, wherein the plurality of communication lines comprise an optical fiber that carries a single wavelength through the optical fiber.*

*41. The method of claim 34, wherein the air interface standard comprises one of a code division multiple access (CDMA) air interface standard and a time division multiple access (TDMA) air interface standard.*

*42. The method of claim 41, wherein the transmissions from said subscriber units communicating with said base station comprises one of CDMA transmissions and TDMA transmissions.*

* * * * *